US 6,663,509 B2

(12) United States Patent
Nesbitt et al.

(10) Patent No.: US 6,663,509 B2
(45) Date of Patent: *Dec. 16, 2003

(54) MULTILAYER GOLF BALL WITH FILLED INNER LAYER HAVING DUAL CORE, LIQUID CORE, OR WOUND CORE

(75) Inventors: R. Dennis Nesbitt, Westfield, MA (US); Mark L. Binette, Ludlow, MA (US); Michael J. Sullivan, Barrington, RI (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/217,553

(22) Filed: Aug. 13, 2002

(65) Prior Publication Data

US 2003/0109330 A1 Jun. 12, 2003

Related U.S. Application Data

(63) Continuation of application No. 09/524,031, filed on Mar. 13, 2000, now Pat. No. 6,432,000, which is a continuation-in-part of application No. 08/926,872, filed on Sep. 10, 1997, which is a division of application No. 08/631,613, filed on Apr. 10, 1996, now Pat. No. 5,803,831, which is a continuation-in-part of application No. 08/591,046, filed on Jan. 25, 1996, now abandoned, and a continuation-in-part of application No. 08/542,793, filed on Oct. 13, 1995, now abandoned, which is a continuation-in-part of application No. 08/070,510, filed on Jun. 1, 1993, now abandoned, said application No. 09/524,031, is a continuation-in-part of application No. 08/870,585, filed on Jun. 6, 1997, now abandoned, which is a continuation of application No. 08/556,237, filed on Nov. 9, 1995, now abandoned, which is a continuation-in-part of application No. 08/542,793, filed on Oct. 13, 1995, now abandoned, which is a continuation-in-part of application No. 08/070,510, said application No. 09/524,031, is a continuation-in-part of application No. 08/714,661, filed on Sep. 16, 1996, now Pat. No. 6,368,237, which is a division of application No. 08/562,540, filed on Nov. 20, 1995, now abandoned, which is a continuation of application No. 08/070,510.

(60) Provisional application No. 60/042,439, filed on Mar. 28, 1997, provisional application No. 60/042,430, filed on Mar. 28, 1997, and provisional application No. 60/042,120, filed on Mar. 28, 1997.

(51) Int. Cl.$^7$ ............................................. A63B 37/06
(52) U.S. Cl. ..................................................... 473/377
(58) Field of Search ............................... 473/373, 374, 473/376, 377, 301, 367, 368

(56) References Cited

U.S. PATENT DOCUMENTS 696,887 A    4/1902  Kempshall (List continued on next page.)

FOREIGN PATENT DOCUMENTS

GB    2 278 609 A    12/1994

(List continued on next page.)

*Primary Examiner*—Mark S. Graham
*Assistant Examiner*—Raeann Gordon

(57) ABSTRACT

The present invention is directed to a golf ball comprising a dual core, a triple core, a cellular core, a liquid core, or a wound core; an inner cover layer and an outer cover layer; and at least 50 parts by weight of a non-ionomeric polyolefin material disposed in an inner layer within the ball. The dual or triple cores comprise an interior spherical center component formed from a thermoset material, a thermoplastic material, or combinations thereof; a core layer disposed about the center component, formed from a thermoset material, a thermoplastic material, or combinations thereof; and an optional outer core layer that surrounds the core component. The inner cover layer is comprised of a high acid ionomer or ionomer blend. The outer cover layer is comprised of a soft, very low modulus ionomer or ionomer blend, or a non-ionomeric thermoplastic elastomer such as polyurethane, polyester or polyesteramide. The resulting multi-layered golf ball of the present invention provides for enhanced distance without sacrificing playability or durability when compared to known multi-layer golf balls.

20 Claims, 6 Drawing Sheets

U.S. PATENT DOCUMENTS

| | | |
|---|---|---|
| 696,890 A | 4/1902 | Kempshall |
| 696,891 A | 4/1902 | Kempshall |
| 696,895 A | 4/1902 | Kempshall |
| 697,816 A | 4/1902 | Davis |
| 697,925 A | 4/1902 | Kempshall |
| 699,089 A | 4/1902 | Kempshall |
| 700,656 A | 5/1902 | Kempshall |
| 700,658 A | 5/1902 | Kempshall |
| 700,660 A | 5/1902 | Kempshall |
| 701,741 A | 6/1902 | Kempshall |
| 704,748 A | 7/1902 | Kempshall |
| 704,838 A | 7/1902 | Kempshall |
| 705,249 A | 7/1902 | Kempshall |
| 705,359 A | 7/1902 | Kempshall |
| 707,263 A | 8/1902 | Saunders |
| 711,177 A | 10/1902 | Richards |
| 711,227 A | 10/1902 | Richards |
| 711,474 A | 10/1902 | Chapman |
| 712,413 A | 10/1902 | Richards |
| 713,772 A | 11/1902 | Kempshall |
| 719,499 A | 2/1903 | Painter |
| 720,852 A | 2/1903 | Smith, Jr. |
| 727,852 A | 5/1903 | Richards |
| 739,753 A | 9/1903 | Kempshall |
| 740,403 A | 10/1903 | Day |
| 906,644 A | 12/1908 | Meade |
| 985,741 A | 2/1911 | Harvey |
| 1,182,604 A | 5/1916 | Wadsworth |
| 1,182,605 A | 5/1916 | Wadsworth |
| 1,255,388 A | 2/1918 | Cobb |
| 1,270,008 A | 6/1918 | Cobb |
| 1,339,992 A | 5/1920 | Wais |
| 1,568,514 A | 1/1926 | Lewis |
| 1,586,514 A | 6/1926 | Arnott |
| 1,591,117 A | 7/1926 | Floyd |
| 2,055,326 A | 9/1936 | Young |
| 2,258,331 A | 10/1941 | Miller |
| 2,258,332 A | 10/1941 | Miller |
| 2,258,333 A | 10/1941 | Miller |
| 2,364,955 A | 12/1944 | Diddel |
| 2,786,684 A | 3/1957 | Muccino |
| 3,031,194 A | 4/1962 | Strayer |
| 3,218,075 A | 11/1965 | Shakespeare |
| 3,421,766 A | 1/1969 | Chimel et al. |
| 3,534,965 A | 10/1970 | Harrison et al. |
| 3,572,721 A | 3/1971 | Harrison et al. |
| 3,572,722 A | 3/1971 | Harrison et al. |
| 3,671,477 A | 6/1972 | Nesbitt |
| 3,908,993 A | 9/1975 | Gentiluomo |
| 3,940,145 A | 2/1976 | Gentiluomo |
| 4,085,937 A | 4/1978 | Schenk |
| 4,123,061 A | 10/1978 | Dusbiber |
| 4,274,637 A | 6/1981 | Molitor |
| 4,431,193 A | 2/1984 | Nesbitt |
| 4,483,537 A | 11/1984 | Hanada et al. |
| 4,653,758 A | 3/1987 | Solheim |
| 4,674,751 A | 6/1987 | Molitor et al. |
| 4,679,795 A | 7/1987 | Melvin et al. |
| 4,805,914 A | 2/1989 | Toland |
| 4,836,552 A | 6/1989 | Puckett et al. |
| 4,839,116 A | 6/1989 | Puckett et al. |
| 4,844,471 A | 7/1989 | Terence et al. |
| 4,848,770 A | 7/1989 | Shama |
| 4,863,167 A | 9/1989 | Matsuki et al. |
| 4,884,814 A | 12/1989 | Sullivan |
| 4,886,275 A | 12/1989 | Walker |
| 4,911,451 A | 3/1990 | Sullivan et al. |
| 4,919,434 A | 4/1990 | Saito |
| 4,943,055 A | 7/1990 | Corley |
| 4,955,966 A | 9/1990 | Yuki et al. |
| 4,986,545 A | 1/1991 | Sullivan |
| 4,995,613 A | 2/1991 | Walker |
| 5,002,281 A | 3/1991 | Nakahara et al. |
| 5,018,740 A | 5/1991 | Sullivan |
| 5,019,319 A | 5/1991 | Nakamura et al. |
| 5,020,803 A | 6/1991 | Gendreau et al. |
| 5,037,104 A | 8/1991 | Watanabe et al. |
| 5,048,838 A | 9/1991 | Chikaraishi et al. |
| 5,068,151 A | 11/1991 | Nakamura |
| 5,098,105 A | 3/1992 | Sullivan |
| 5,104,126 A | 4/1992 | Gentiluomo |
| 5,120,791 A | 6/1992 | Sullivan |
| 5,150,905 A | 9/1992 | Yuki et al. |
| 5,150,906 A | 9/1992 | Molitor et al. |
| 5,184,828 A | 2/1993 | Kim et al. |
| 5,187,013 A | 2/1993 | Sullivan |
| 5,194,191 A | 3/1993 | Nomura et al. |
| 5,253,871 A | 10/1993 | Viollaz |
| 5,273,286 A | 12/1993 | Sun |
| 5,314,187 A | 5/1994 | Proudfit |
| 5,421,580 A | 6/1995 | Sugimoto et al. |
| 5,439,227 A | 8/1995 | Egashira et al. |
| 5,452,898 A | 9/1995 | Yamagishi et al. |
| 5,480,155 A | 1/1996 | Molitor et al. |
| 5,511,791 A | 4/1996 | Ebisuno et al. |
| 5,556,098 A | 9/1996 | Higuchi et al. |
| 5,586,950 A | 12/1996 | Endo |
| 5,628,699 A | 5/1997 | Maruko et al. |
| 5,633,322 A | 5/1997 | Yabuki et al. |
| 5,645,497 A | 7/1997 | Sullivan et al. |
| 5,663,235 A | 9/1997 | Tanaka |
| 5,674,137 A | 10/1997 | Maruko et al. |
| 5,683,312 A | 11/1997 | Boehm et al. |
| 5,688,191 A | 11/1997 | Cavallaro et al. |
| 5,688,192 A | 11/1997 | Aoyama |
| 5,688,595 A | 11/1997 | Yamagishi et al. |
| 5,695,413 A | 12/1997 | Yamagishi et al. |
| 5,702,311 A | 12/1997 | Higuchi et al. |
| 5,703,166 A | 12/1997 | Rajagopalan et al. |
| 5,704,854 A | 1/1998 | Higuchi et al. |
| 5,713,801 A | 2/1998 | Aoyama |
| 5,713,802 A | 2/1998 | Moriyama et al. |
| 5,725,442 A | 3/1998 | Higuchi et al. |
| 5,733,205 A | 3/1998 | Higuchi et al. |
| 5,752,888 A | 5/1998 | Maruko et al. |
| 5,759,676 A | 6/1998 | Cavallaro et al. |
| 5,762,568 A | 6/1998 | Kato |
| 5,766,096 A | 6/1998 | Maruko et al. |
| 5,772,530 A | 6/1998 | Kato |
| 5,779,561 A | 7/1998 | Sullivan et al. |
| 5,779,562 A | 7/1998 | Melvin et al. |
| 5,779,563 A | 7/1998 | Yamagishi et al. |
| 5,783,293 A | 7/1998 | Lammi |
| 5,803,831 A | 9/1998 | Sullivan |
| 5,810,678 A | 9/1998 | Cavallaro et al. |
| 5,816,937 A | 10/1998 | Shimosaka et al. |
| 5,820,485 A | 10/1998 | Hwang |
| 5,830,086 A | 11/1998 | Hayashi et al. |
| 5,833,552 A | 11/1998 | Hamada et al. |
| 5,873,796 A | 2/1999 | Cavallaro |
| 5,879,244 A | 3/1999 | Hwang |
| 5,885,172 A | 3/1999 | Hebert et al. |
| 5,902,855 A | 5/1999 | Sullivan |
| 5,913,736 A | 6/1999 | Machara et al. |
| 5,919,100 A | 7/1999 | Boehm et al. |
| 5,952,415 A | 9/1999 | Hwang |
| 5,980,396 A | 11/1999 | Moriyama et al. |
| 6,057,403 A | 5/2000 | Sullivan et al. |
| 6,083,119 A | 7/2000 | Sullivan et al. |
| 6,432,000 B1 | 8/2002 | Nesbitt et al. |

FOREIGN PATENT DOCUMENTS

| | | |
|---|---|---|
| GB | 2 291 811 A | 2/1996 |
| GB | 2 291 812 A | 2/1996 |
| GB | 2 299 999 A | 10/1996 |
| GB | 2 323 540 | 9/1998 |
| WO | WO 98/43709 | 10/1998 |
| WO | WO 99 48569 | 9/1999 |

MULTILAYER GOLF BALL WITH FILLED INNER LAYER HAVING DUAL CORE, LIQUID CORE, OR WOUND CORE

CROSS-REFERENCES TO RELATED APPLICATIONS

This application is a continuation of U.S. application Ser. No. 09/524,031 filed on Mar. 13, 2000, now U.S. Pat. No. 6,432,000, which is a continuation-in-part application of U.S. application Ser. No, 08/926,872 filed on Sep. 10, 1997, which is a divisional of U.S. application Ser. No. 08/631,613 filed on Apr. 10, 1996, now U.S. Pat. No. 5,803,831, which in turn is a continuation-in-part of U.S. application Ser. No. 08/591,046 filed on Jan. 25, 1996, now abandoned, and a continuation-in-part of U.S. application Ser. No. 08/542,793 filed on Oct. 13, 1995, now abandoned, which in turn is a continuation-in-part of U.S. application Ser. No. 08/070,510 filed Jun. 1, 1993, now abandoned. application Ser. No. 09/524,031 is also a continuation-in-part of U.S. application Ser. No. 08/870,585 flied on Jun. 6, 1997, now abandoned, which is a continuation of U.S. application Ser. No. 08/556, 237 filed on Nov. 9, 1995, now abandoned, which is a continuation-in-part of U.S. application Ser. No. 08/542,793 filed Oct. 13, 1995, now abandoned, which is a continuation-in-pan of U.S. application Ser. No. 08/070,510 filed on Jun. 1, 1993, now abandoned. application Ser. No. 09/524,031 is also a continuation-in-part of U.S. application Ser. No. 08/714,661, flied on Sep. 16, 1996, now U.S. Pat. No. 6,368,237, which is a divisional of U.S. application Ser. No. 08/562,540 filed on Nov. 20, 1995, now abandoned, which is a continuation of U.S. application Ser. No. 08/070,510 filed on Jun. 1, 1993, now abandoned. application Ser. No. 08/926,872 also claims priority from U.S. provisional application Ser. No. 60/042,120, filed Mar. 28, 1997; provisional application Ser. No. 60/042,439, filed Mar. 28, 1997; and U.S. provisional patent application Ser. No. 60/042,439 filed Mar. 28, 1997.

FIELD OF THE INVENTION

The present invention relates to golf balls and, more particularly, to improved golf balls comprising multi-layer covers which have a comparatively hard inner layer and a relatively soft outer layer, and a dual or triple core, a cellular or liquid core, or a wound core. The improved multi-layer golf balls provide enhanced distance and durability properties over single layer cover golf balls while at the same time offering enhanced "feel" and spin characteristics generally associated with soft balata and balata-like covers of the prior art. The present invention further relates to golf balls and, more particularly, to golf balls comprising one or more optional mantle layers. The golf balls may contain a filled inner layer comprising at least 50 parts by weight of non-ionomeric polyolefin material. The golf balls may additionally comprise an optional polymeric outer cover and/or an inner polymeric hollow sphere substrate.

BACKGROUND OF THE INVENTION

Traditional golf ball covers have been comprised of balata or blends of balata with elastomeric or plastic materials. The traditional balata covers are relatively soft and flexible. Upon impact, the soft balata covers compress against the surface of the club producing high spin. Consequently, the soft and flexible balata covers provide an experienced golfer with the ability to apply a spin to control the ball in flight in order to produce a draw or a fade, or a backspin which causes the ball to "bite" or stop abruptly on contact with the green. Moreover, the soft balata covers produce a soft "feel" to the low handicap player. Such playability properties (workability, feel, etc.) are particularly important in short iron play with low swing speeds and are exploited significantly by relatively skilled players.

Despite all the benefits of balata, balata covered golf balls are easily cut and/or damaged if mis-hit. Golf balls produced with balata or balata-containing cover compositions therefore have a relatively short lifespan.

As a result of this negative property, balata and its synthetic substitutes, transpolybutadiene and transpolyisoprene, have been essentially replaced as the cover materials of choice by new cover materials comprising ionomeric resins.

Ionomeric resins are polymers containing interchain ionic bonding. As a result of their toughness, durability and flight characteristics, various ionomeric resins sold by E. I. DuPont de Nemours & Company under the trademark "Surlyn®" and more recently, by the Exxon Corporation (see U.S. Pat. No. 4,911,451) under the trademarks "ESCOR®" and the trade name "lotek," have become the materials of choice for the construction of golf ball covers over the traditional "balata" (transpolyisoprene, natural or synthetic) rubbers. As stated, the softer balata covers, although exhibiting enhanced playability properties, lack the durability (cut and abrasion resistance, fatigue endurance, etc.) properties required for repetitive play.

Ionomeric resins are generally ionic copolymers of an olefin, such as ethylene, and a metal salt of an unsaturated carboxylic acid, such as acrylic acid, methacrylic acid, or maleic acid. Metal ions, such as sodium or zinc, are used to neutralize some portion of the acidic group in the copolymer resulting in a thermoplastic elastomer exhibiting enhanced properties, i.e. durability, etc., for golf ball cover construction over balata. However, some of the advantages gained in increased durability have been offset to some degree by the decreases produced in playability. This is because although the ionomeric resins are very durable, they tend to be very hard when utilized for golf ball cover construction, and thus lack the degree of softness required to impart the spin necessary to control the ball in flight. Since the ionomeric resins are harder than balata, the ionomeric resin covers do not compress as much against the face of the club upon impact, thereby producing less spin. In addition, the harder and more durable ionomeric resins lack the "feel" characteristic associated with the softer balata related covers.

As a result, while there are currently more than fifty (50) commercial grades of ionomers available both from DuPont and Exxon, with a wide range of properties which vary according to the type and amount of metal cations, molecular weight, composition of the base resin (i.e., relative content of ethylene and methacrylic and/or acrylic acid groups) and additive ingredients such as reinforcement agents, etc., a great deal of research continues in order to develop a golf ball cover composition exhibiting not only the improved impact resistance and carrying distance properties produced by the "hard" ionomeric resins, but also the playability (i.e., "spin," "feel," etc.) characteristics previously associated with the "soft" balata covers, properties which are still desired by the more skilled golfer.

Consequently, a number of two-piece (a solid resilient center or core with a molded cover) and three-piece (a liquid or solid center, elastomeric winding about the center, and a molded cover) golf balls have been produced to address these needs. The different types of materials utilized to formulate the cores, coves, etc. of these balls dramatically alters the balls' overall characteristics. In addition, multi-layered covers containing one or more ionomer resins have also been formulated in an attempt to produce a golf ball having the overall distance, playability and durability characteristics desired.

This was addressed by Spalding Sports Worldwide, Inc., the assignee of the present invention, in U.S. Pat. No. 4,431,193 where a multi-layered golf ball is produced by initially molding a first cover layer on a spherical core and then adding a second layer. The first layer is comprised of a hard, high flexural modulus resinous material such as type 1605 Surlyn® (now designated Surlyn® 8940). Type 1605 Surlyn (Surlyn® 8940) is a sodium ion based low acid (less than or equal to 15 weight percent methacrylic acid) ionomer resin having a flexural modulus of about 51,000 psi. An outer layer of a comparatively soft, low flexural modulus resinous material such as type 1855 Surlyn® (now designated Surlyn® 9020) is molded over the inner cover layer. Type 1855 Surlyn® (Surlyn® 9020) is a zinc ion based low acid (10 weight percent methacrylic acid) ionomer resin having a flexural modulus of about 14,000 psi.

The '193 patent teaches that the hard, high flexural modulus resin which comprises the first layer provides for a gain in coefficient of restitution over the coefficient of restitution of the core. The increase in the coefficient of restitution provides a ball which serves to attain or approach the maximum initial velocity limit of 255 feet per second as provided by the United States Golf Association (U.S.G.A.) rules. The relatively soft, low flexural modulus outer layer provides for the advantageous "feel" and playing characteristics of a balata covered golf ball.

In various attempts to produce a durable, high spin ionomer golf ball, the golfing industry has blended the hard ionomer resins with a number of softer ionomeric resins. U.S. Pat. Nos. 4,884,814 and 5,120,791 are directed to cover compositions containing blends of hard and soft ionomeric resins. The hard copolymers typically are made from an olefin and an unsaturated carboxylic acid. The soft copolymers are generally made from an olefin, an unsaturated carboxylic acid, and an acrylate ester. It has been found that golf ball covers formed from hard-soft ionomer blends tend to become scuffed more readily than covers made of hard ionomer alone. It would be useful to develop a golf ball having a combination of softness and durability which is better than the softness-durability combination of a golf ball cover made from a hard-soft ionomer blend.

Most professional golfers and good amateur golfers desire a golf ball that provides distance when hit off a driver, control and stopping ability on full iron shots, and high spin on short "touch and feel" shots. Many conventional two-piece and thread wound performance golf balls have undesirable high spin rates on full shots. The excessive spin on full shots is a sacrifice made in order to achieve more spin which is desired on the shorter touch shots. It would be beneficial to provide a golf ball which has high spin for touch shots without generating excessive spin on full shots.

Prior artisans have attempted to incorporate metal layers or metal filler particles in golf balls to alter the physical characteristics and performance of the balls. For example, U.S. Pat. No. 3,031,194 to Strayer is directed to the use of a spherical inner metal layer that is bonded or otherwise adhered to a resilient inner constituent within the ball. The ball utilizes a liquid filled core. U.S. Pat. No. 4,863,167 to Matsuki, et al. describes golf balls containing a gravity filler which may be formed from one or more metals disposed within a solid rubber-based core. U.S. Pat. Nos. 4,886,275 and 4,995,613, both to Walker, disclose golf balls having a dense metal-containing core. U.S. Pat. No. 4,943,055 to Corley is directed to a weighted warmup ball having a metal center.

Prior artisans have also described golf balls having one or more interior layers formed from a metal, and which feature a hollow center. Davis disclosed a golf ball comprising a spherical steel shell having a hollow air-filled center in U.S. Pat. No. 697,816. Kempshall received numerous patents directed to golf balls having metal inner layers and hollow interiors, such as 704,748; 704,838; 713,772; and 739,753. In U.S. Pat. Nos. 1,182,604 and 1,182,605, Wadsworth described golf balls utilizing concentric spherical shells formed from tempered steel. U.S. Pat. No. 1,568,514 to Lewis describes several embodiments for a golf ball, one of which utilizes multiple steel shells disposed within the ball, and which provide a hollow center for the ball.

Prior artisans have attempted to provide golf balls having liquid filled centers. Toland described a golf ball having a liquid core in U.S. Pat. No. 4,805,914. Toland describes improved performance by removing dissolved gases present in the liquid to decrease the degree of compressibility of the liquid core. U.S. Pat. No. 5,037,104 to Watanabe, et al. and U.S. Pat. No. 5,194,191 to Nomura, et al. disclose thread wound golf balls having liquid cores. Similarly, U.S. Pat. No. 5,421,580 to Sugimoto, et al. and U.S. Pat. No. 5,511,791 to Ebisuno, et al. are both directed to thread wound golf balls having liquid cores limited to a particular range of viscosities or diameters. Moreover, Molitor, et al. described golf balls with liquid centers in U.S. Pat. Nos. 5,150,906 and 5,480,155.

The only known U.S. patents disclosing a golf ball having a metal mantle layer in combination with a liquid core are U.S. Pat. No. 3,031,194 to Strayer and the previously noted U.S. Pat. No. 1,568,514 to Lewis. Unfortunately, the ball constructions and design teachings disclosed in these patents involve a large number of layers of different materials, relatively complicated or intricate manufacturing requirements, and/or utilize materials that have long been considered unacceptable for the present golf ball market.

Concerning attempts to provide golf balls with cellular or foamed polymeric materials utilized as a core, few approaches have been proposed. U.S. Pat. No. 4,839,116 to Puckett, et al. discloses a short distance golf ball. It is believed that artisans considered the use of foam or a cellular material undesirable in a golf ball, perhaps from a believed loss or decrease in the coefficient of restitution of a ball utilizing a cellular core.

Although satisfactory in at least some respects, all of the foregoing ball constructions, particularly the few utilizing a metal shell and a liquid core, are deficient. This is most evident when considered in view of the stringent demands of the current golf industry. Moreover, the few disclosures of a golf ball comprising a cellular or foam material do not motivate one to employ a cellular material in a regulation golf ball. Specifically, there is a need for a golf ball that exhibits a high initial velocity or coefficient of restitution (C.O.R.), may be driven relatively long distances in regulation play, and which may be readily and inexpensively manufactured.

These and other objects and features of the invention will be apparent from the following summary and description of the invention, the drawings and from the claims.

SUMMARY OF THE INVENTION

In one aspect, the present invention provides a golf ball comprising a dual core comprising a core, an outermost cover layer disposed about the core, at least one inner layer disposed within the ball between the core and the outermost cover layer, and at least 50 parts by weight of non-ionomeric polyolefin material.

In yet another aspect, the present invention provides a multi-layer golf ball comprising a core, an outermost cover layer disposed about the core, at least one inner layer disposed within the ball between the core and the outermost cover layer, and at least 50 parts by weight of non-ionomeric polyolefin material disposed in the inner layer. The outermost cover layer exhibits a Shore D hardness less than 55. The inner layer exhibits a Shore D hardness of at least 60.

In yet another aspect, the present invention provides a golf ball comprising a core, an outer cover layer disposed about the core, an inner cover layer positioned between the core and the outer cover layer and at least 75 parts by weight of non-ionomeric polyolefin material. The outer cover layer exhibits a Shore D hardness less than 55. And, the inner cover layer exhibits a Shore D hardness of at least 60.

DETAILED DESCRIPTION OF THE PREFERRED EMBODIMENTS

Figure 1:
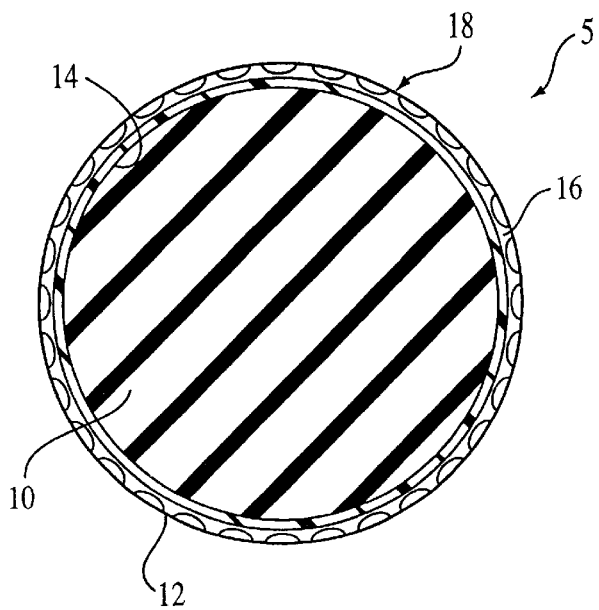
FIG. 1 is a cross-sectional view of a preferred embodiment golf ball in accordance with the present invention illustrating a core and a cover comprising an inner layer and an outer dimpled layer.

The present invention is directed to a golf ball comprising a dual core component, a triple core component, a cellular core, a liquid core, or a wound core; a multi-layer cover; and at least 50 parts by weight of a non-ionomeric polyolefin material disposed in an inner layer within the ball.

The novel multi-layer golf ball covers of the present invention include a first or inner layer or ply of a high acid (greater than 16 weight percent acid) ionomer blend or, more preferably, a low acid (16 weight percent acid or less) ionomer blend and second or outer layer or ply comprised of a comparatively softer, low modulus ionomer, ionomer blend or other non-ionomeric thermoplastic or thermosetting elastomer such as polyurethane or polyester elastomer. The multi-layer golf balls of the present invention can be of standard or enlarged size.

In one aspect, the present invention golf balls preferably utilize a unique dual-core configuration. Preferably, the cores comprise (i) an interior spherical center component formed from a thermoset material, a thermoplastic material, or combinations thereof; and (ii) a core layer disposed about the spherical center component, the core layer formed from a thermoset material, a thermoplastic material, or combinations thereof. The cores may further comprise (iii) an optional outer core layer disposed about the core layer. The outer core layer may be formed from a thermoset material, a thermoplastic material, or combinations thereof. Generally, as described herein, the term dual core component as used herein refers to cores comprising (i) and (ii). And, the term triple core component refers to cores comprising (i), (ii) and (iii).

In other aspects, the present invention golf balls utilizes a cellular core, a liquid core, or a wound core in combination with a multi-layer cover and the incorporation of at least 50 parts by weight of a non-ionomeric polyolefin material disposed in an inner layer. These are described in detail herein.

It has been found that multi-layer golf balls having inner and outer cover layers exhibit higher C.O.R. values and have greater travel distance in comparison with balls made from a single cover layer. In addition, it has been found that use of an inner cover layer constructed of a blend of low acid (i.e., 16 weight percent acid or less) ionomer resins produces softer compression and higher spin rates than inner cover layers constructed of high acid ionomer resins. This is compounded by the fact that the softer outer layer adds to the desirable "feel" and high spin rate while maintaining respectable resilience. The soft outer layer allows the cover to deform more during impact and increases the area of contact between the club face and the cover, thereby imparting more spin on the ball. As a result, the soft cover provides the ball with a balata-like feel and playability characteristics with improved distance and durability.

Consequently, the overall combination of the particular core constructions, described in greater detail herein, and the multi-layer cover configuration of inner and outer cover layers made, for example, from blends of various ionomer resins results in a standard size or oversized golf ball having enhanced resilience (improved travel distance) and durability (i.e. cut resistance, etc.) characteristics while maintaining and in many instances, improving the ball's playability properties.

The combination of a certain inner cover layer with a soft, relatively low modulus outer cover layer provides for good overall coefficient of restitution (i.e., enhanced resilience) while at the same time demonstrating improved compression and spin. The outer cover layer generally contributes to a more desirable feel and spin, particularly at lower swing speeds with highly lofted clubs such as half wedge shots.

Accordingly, the present invention is directed to a golf ball comprising a particular core configuration and an improved multi-layer cover which produces, upon molding each layer around a core to formulate a multi-layer cover, a golf ball exhibiting enhanced distance (i.e., resilience) without adversely affecting, and in many instances, improving the ball's playability (hardness/softness) and/or durability (i.e., cut resistance, fatigue resistance, etc.) characteristics.

Figure 2:
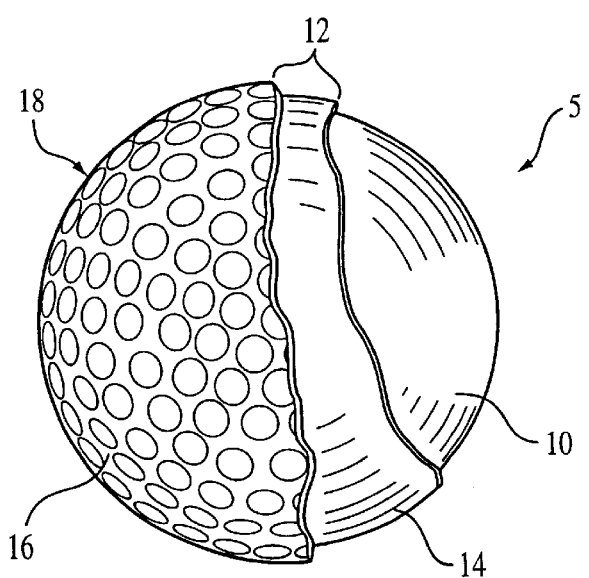
FIG. 2 is a diametrical cross-sectional view of the preferred embodiment golf ball depicted in FIG. 1 having a core and a cover comprising an inner layer surrounding the core and an outer layer having a plurality of dimples.

FIGS. 1 and 2 illustrate a preferred embodiment golf ball 5 in accordance with the present invention. It will be understood that none of the referenced figures are to scale. And so, the thicknesses and proportions of the various layers and the diameter of the various core components are not necessarily as depicted. The golf ball 5 comprises a multi-layered cover 12 disposed about a core 10. The core 10 of the golf ball can be formed of a solid, a liquid, or any other substances that may be utilized to form the cores described herein. The multi-layered cover 12 comprises two layers: a first or inner layer or ply 14 and a second or outer layer or ply 16. The inner layer 14 can be ionomer, ionomer blends, non-ionomer, non-ionomer blends, or blends of ionomer and non-ionomer. The outer layer 16 is softer than the inner layer and can be ionomer, ionomer blends, non-ionomer, non-ionomer blends or blends of ionomer and non-ionomer.

In a first preferred embodiment, the inner layer 14 is comprised of a high acid (i.e. greater than 16 weight percent acid) ionomer resin or high acid ionomer blend. Preferably, the inner layer is comprised of a blend of two or more high acid (i.e., at least 16 weight percent acid) ionomer resins neutralized to various extents by different metal cations. The inner cover layer may or may not include a metal stearate (e.g., zinc stearate) or other metal fatty acid salt. The purpose of the metal stearate or other metal fatty acid salt is to lower the cost of production without affecting the overall performance of the finished golf ball. In a second embodiment, the inner layer 14 is comprised of a low acid (i.e., 16 weight percent acid or less) ionomer blend. Preferably, the inner layer is comprised of a blend of two or more low acid (i.e., 16 weight percent acid or less) ionomer resins neutralized to various extents by different metal cations. The inner cover layer may or may not include a metal stearate (e.g., zinc stearate) or other metal fatty acid salt. The purpose of the metal stearate or other metal fatty acid salt is to lower the cost of production without affecting the overall performance of the finished golf ball.

Two principal properties involved in golf ball performance are resilience and hardness. Resilience is determined by the coefficient of restitution (C.O.R.), the constant "e" which is the ratio of the relative velocity of two elastic spheres after direct impact to that before impact. As a result, the coefficient of restitution ("e") can vary from 0 to 1, with 1 being equivalent to an elastic collision and 0 being equivalent to an inelastic collision.

Resilience (C.O.R.), along with additional factors such as club head speed, angle of trajectory and ball configuration (i.e., dimple pattern) generally determine the distance a ball will travel when hit. Since club head speed and the angle of trajectory are factors not easily controllable by a manufacturer, factors of concern among manufacturers are the coefficient of restitution (C.O.R.) and the surface configuration of the ball.

The coefficient of restitution (C.O.R.) in solid core balls is a function of the composition of the molded core and of the cover. In balls containing a dual core (i.e., balls comprising an interior spherical center component, a core layer disposed about the spherical center component, and a cover), the coefficient of restitution is a function of not only the composition of the cover, but also the composition and physical characteristics of the interior spherical center component and core layer. Both the dual core and the cover contribute to the coefficient of restitution in the golf balls of the present invention.

In this regard, the coefficient of restitution of a golf ball is generally measured by propelling a ball at a given speed against a hard surface and measuring the ball's incoming and outgoing velocity electronically. As mentioned above, the coefficient of restitution is the ratio of the outgoing velocity to the incoming velocity. The coefficient of restitution must be carefully controlled in all commercial golf balls in order for the ball to be within the specifications regulated by the United States Golf Association (U.S.G.A.). The U.S.G.A. standards indicate that a "regulation" ball cannot have an initial velocity (i.e., the speed off the club) exceeding 255 feet per second. Since the coefficient of restitution of a ball is related to the ball's initial velocity, it is highly desirable to produce a ball having sufficiently high coefficient of restitution to closely approach the U.S.G.A. limit on initial velocity, while having an ample degree of softness (i.e., hardness) to produce enhanced playability (i.e., spin, etc.).

The hardness of the ball is the second principal property involved in the performance of a golf ball. The hardness of the ball can affect the playability of the ball on striking and the sound or "click" produced. Hardness is determined by the deformation (i.e., compression) of the ball under various load conditions applied across the ball's diameter (i.e., the lower the compression value, the harder the material). As indicated in U.S. Pat. No. 4,674,751, softer covers permit the accomplished golfer to impart proper spin.

This is because the softer covers deform on impact significantly more than balls having "harder" ionomeric resin covers. As a result, the better player is allowed to impart fade, draw or backspin to the ball thereby enhancing playability. Such properties may be determined by various spin rate tests.

It has been found that a hard inner layer provides for a substantial increase in resilience (i.e., enhanced distance) over known multi-layer covered balls. The softer outer layer provides for desirable "feel" and high spin rate while maintaining respectable resiliency. The soft outer layer allows the cover to deform more during impact and increases the area of contact between the club face and the cover, thereby imparting more spin on the ball. As a result, the soft cover provides the ball with a balata-like feel and playability characteristics with improved distance and durability. Consequently, the overall combination of the inner and outer cover layers results in a golf ball having enhanced resilience (improved travel distance) and durability (i.e., cut resistance, etc.) characteristics while maintaining and in many instances, improving the playability properties of the ball.

The combination of a hard inner cover layer with a soft, relatively low modulus ionomer, ionomer blend or other non-ionomeric thermoplastic elastomer outer cover layer provides for excellent overall coefficient of restitution (i.e., excellent resilience) because of the improved resiliency produced by the inner cover layer. While some improvement in resiliency is also produced by the outer cover layer, the outer cover layer generally provides for a more desirable feel and high spin, particularly at lower swing speeds with highly lofted clubs such as half wedge shots.

Details of the components of the preferred embodiment golf balls according to the present invention are as follows.

Inner Cover Layer

The inner cover layer is harder than the outer cover layer and generally has a thickness in the range of 0.01 to 0.10 inches, preferably 0.03 to 0.07 inches for a 1.68 inch ball and 0.05 to 0.10 inches for a 1.72 inch (or more) ball. The core and inner cover layer together form an inner ball having a coefficient of restitution of 0.780 or more and more preferably 0.790 or more, and a diameter in the range of 1.48–1.66 inches for a 1.68 inch ball and 1.50–1.70 inches for a 1.72 inch (or more) ball. The inner cover layer has a Shore D hardness of 60 or more. It is particularly advantageous if the golf balls of the invention have an inner layer with a Shore D hardness of 65 or more, and preferably 70 or more. The above-described characteristics of the inner cover layer provide an inner ball having a PGA compression of 100 or less. It is found that when the inner ball has a PGA compression of 90 or less, excellent playability results.

The inner layer compositions include the high acid ionomers such as those developed by E. I. DuPont de Nemours & Company under the trademark "Surlyn®" and by Exxon Corporation under the trademark "Escor®" or trade name "Iotek", or blends thereof. Examples of compositions which may be used as the inner layer herein are set forth in detail in a continuation of U.S. application Ser. No. 08/174,765, which is a continuation of U.S. application Ser. No. 07/776,803 filed Oct. 15, 1991, and Ser. No. 08/493,089, which is a continuation of Ser. No. 07/981,751, which in turn is a continuation of Ser. No. 07/901,660 filed Jun. 19, 1992, all of which are incorporated herein by reference. Of course, the inner layer high acid ionomer compositions are not limited in any way to those compositions set forth in the noted applications.

The high acid ionomers which may be suitable for use in formulating the inner layer compositions are ionic copolymers which are the metal, i.e., sodium, zinc, magnesium, etc., salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (i.e., iso- or n-butylacrylate, etc.) can also be included to produce a softer terpolymer. The carboxylic acid groups of the copolymer are partially neutralized (i.e., approximately 10–100%, preferably 30–70%) by the metal ions. Each of the high acid ionomer resins which may be included in the inner layer cover compositions of the invention contains greater than about 16% by weight of a carboxylic acid, preferably from about 17% to about 25% by weight of a carboxylic acid, more preferably from about 18.5% to about 21.5% by weight of a carboxylic acid.

Although the inner layer cover composition of several embodiments of the present invention preferably includes a high acid ionomeric resin, the scope of the patent embraces all known high acid ionomeric resins falling within the parameters set forth above, only a relatively limited number of these high acid ionomeric resins have recently become commercially available.

The high acid ionomeric resins available from Exxon under the designation "Escor®" or "Iotek", are somewhat similar to the high acid ionomeric resins available under the "Surlyn®" trademark. However, since the Escor®/Iotek ionomeric resins are sodium or zinc salts of poly(ethylene-acrylic acid) and the "Surlyn®" resins are zinc, sodium, magnesium, etc. salts of poly(ethylene-methacrylic acid), distinct differences in properties exist.

Examples of the high acid methacrylic acid based ionomers found suitable for use in accordance with this invention include Surlyn®8220 and 8240 (both formerly known as forms of Surlyn AD-8422), Surlyn®9220 (zinc cation), Surlyn®SEP-503-1 (zinc cation), and Surlyn®SEP-503-2 (magnesium cation). According to DuPont, all of these ionomers contain from about 18.5 to about 21.5% by weight methacrylic acid.

More particularly, Surlyn® AD-8422 is currently commercially available from DuPont in a number of different grades (i.e., AD-8422-2, AD-8422-3, AD-8422-5, etc.) based upon differences in melt index. According to DuPont, Surlyn® 8422, which is believed recently to have been redesignated as 8220 and 8240, offers the following general properties when compared to Surlyn® 8920, the stiffest, hardest of all on the low acid grades (referred to as "hard" ionomers in U.S. Pat. No. 4,884,814):

|  | LOW ACID (15 wt % Acid) | HIGH ACID (>20 wt % Acid) | |
| --- | --- | --- | --- |
|  | SURLYN ® 8920 | SURLYN ® 8422-2 | SURLYN ® 8422-3 |
| IONOMER |  |  |  |
| Cation | Na | Na | Na |
| Melt Index | 1.2 | 2.8 | 1.0 |
| Sodium, Wt % | 2.3 | 1.9 | 2.4 |
| Base Resin MI | 60 | 60 | 60 |
| MP$^1$, ° C. | 88 | 86 | 85 |
| FP$^1$, ° C. | 47 | 48.5 | 45 |
| COMPRESSION MOLDING$^2$ |  |  |  |
| Tensile Break, psi | 4350 | 4190 | 5330 |
| Yield, psi | 2880 | 3670 | 3590 |
| Elongation, % | 315 | 263 | 289 |
| Flex Mod, K psi | 53.2 | 76.4 | 88.3 |
| Shore D hardness | 66 | 67 | 68 |

$^1$DSC second heat, 10° C./min heating rate.
$^2$Samples compression molded at 150° C. annealed 24 hours at 60° C. 8422-2, -3 were homogenized at 190° C. before molding.

In comparing Surlyn® 8920 to Surlyn® 8422-2 and Surlyn® 8422-3, it is noted that the high acid Surlyn® 8422-2 and 8422-3 ionomers have a higher tensile yield, lower elongation, slightly higher Shore D hardness and much higher flexural modulus. Surlyn® 8920 contains 15 weight percent methacrylic acid and is 59% neutralized with sodium.

In addition, Surlyn®SEP-503-1 (zinc cation) and Surlyn®SEP-503-2 (magnesium cation) are high acid zinc and magnesium versions of the Surlyn®AD 8422 high acid ionomers. When compared to the Surlyn® AD 8422 high acid ionomers, the Surlyn® SEP-503-1 and SEP-503-2 ionomers can be defined as follows:

| Surlyn ® Ionomer | Ion | Melt Index | Neutralization % |
|---|---|---|---|
| AD 8422-3 | Na | 1.0 | 45 |
| SEP 503-1 | Zn | 0.8 | 38 |
| SEP 503-2 | Mg | 1.8 | 43 |

Further, Surlyn® 8162 is a zinc cation ionomer resin containing approximately 20% by weight (i.e., 18.5–21.5% weight) methacrylic acid copolymer that has been 30–70% neutralized. Surlyn® 8162 is currently commercially available from DuPont.

Examples of the high acid acrylic acid based ionomers suitable for use in the present invention also include the Escor® or Iotek high acid ethylene acrylic acid ionomers produced by Exxon such as Ex 1001, 1002, 959, 960, 989, 990, 1003, 1004, 993, 994. In this regard, Escor® or Iotek 959 is a sodium ion neutralized ethylene-acrylic neutralized ethylene-acrylic acid copolymer. According to Exxon, Ioteks 959 and 960 contain from about 19.0 to 21.0% by weight acrylic acid with approximately 30 to about 70 percent of the acid groups neutralized with sodium and zinc ions, respectively. The physical properties of these high acid acrylic acid based ionomers are set forth in Tables 1 and 2 as follows:

TABLE 1

Physical Properties of Various Ionomers

| PROP-ERTY | Ex1001 | Ex1002 | ESCOR ® (IOTEK) 959 | Ex1003 | Ex1004 | ESCOR ® (IOTEK) 960 |
|---|---|---|---|---|---|---|
| Melt index, g/10 min | 1.0 | 1.6 | 2.0 | 1.1 | 2.0 | 1.8 |
| Cation | Na | Na | Na | Zn | Zn | Zn |
| Melting Point, ° F. | 183 | 183 | 172 | 180 | 180.5 | 174 |
| Vicat Softening Point, ° F. | 125 | 125 | 130 | 133 | 131 | 131 |
| Tensile @ Break | 34.4 MPa | 22.5 MPa | 4600 psi | 24.8 MPa | 20.6 MPa | 3500 psi |
| Elongation @ Break, % | 341 | 348 | 325 | 387 | 437 | 430 |
| Hardness, Shore D | 63 | 62 | 66 | 54 | 53 | 57 |
| Flexural Modulus | 365 MPa | 380 MPa | 66,000 psi | 147 MPa | 130 MPa | 27,000 psi |

TABLE 2

Physical Properties of Various Ionomers

| | | EX 989 | EX 993 | EX 994 | EX 990 |
|---|---|---|---|---|---|
| Melt index | g/10 min | 1.30 | 1.25 | 1.32 | 1.24 |
| Moisture | ppm | 482 | 214 | 997 | 654 |
| Cation type | — | Na | Li | K | Zn |

TABLE 2-continued

Physical Properties of Various Ionomers

| | | EX 989 | EX 993 | EX 994 | EX 990 |
|---|---|---|---|---|---|
| M+ content by AAS | wt % | 2.74 | 0.87 | 4.54 | 0 |
| Zn content by AAS | wt % | 0 | 0 | 0 | 3.16 |
| Density | kg/m³ | 959 | 945 | 976 | 977 |
| Vicat softening point | ° C. | 52.5 | 51 | 50 | 55.0 |
| Crystallization point | ° C. | 40.1 | 39.8 | 44.9 | 54.4 |
| Melting point | ° C. | 82.6 | 81.0 | 80.4 | 81.0 |
| Tensile at yield | MPa | 23.8 | 24.6 | 22 | 16.5 |
| Tensile at break | MPa | 32.3 | 31.1 | 29.7 | 23.8 |
| Elongation at break | % | 330 | 260 | 340 | 357 |
| 1% secant modulus | MPa | 389 | 379 | 312 | 205 |
| Flexural modulus | MPa | 340 | 368 | 303 | 183 |
| Abrasion resistance | mg | 20.0 | 9.2 | 15.2 | 20.5 |
| Hardness Shore D | — | 62 | 62.5 | 61 | 56 |
| Zwick Rebound | % | 61 | 63 | 59 | 48 |

Furthermore, as a result of the development by the assignee of this application of a number of new high acid ionomers neutralized to various extents by several different types of metal cations, such as by manganese, lithium, potassium, calcium and nickel cations, several new high acid ionomers and/or high acid ionomer blends besides sodium, zinc and magnesium high acid ionomers or ionomer blends are now available for golf ball cover production. It has been found that these new cation neutralized high acid ionomer blends produce inner cover layer compositions exhibiting enhanced hardness and resilience due to synergies which occur during processing. Consequently, the metal cation neutralized high acid ionomer resins recently produced can be blended to produce substantially higher C.O.R.'s than those produced by the low acid ionomer inner cover compositions presently commercially available.

More particularly, several new metal cation neutralized high acid ionomer resins have been produced by neutralizing, to various extents, high acid copolymers of an alpha-olefin and an alpha, beta-unsaturated carboxylic acid with a wide variety of different metal cation salts. This discovery is the subject matter of U.S. application Ser. No. 08/493,089, incorporated herein by reference. It has been found that numerous new metal cation neutralized high acid ionomer resins can be obtained by reacting a high acid copolymer (i.e., a copolymer containing greater than 16% by weight acid, preferably from about 17 to about 25 weight percent acid, and more preferably about 20 weight percent acid), with a metal cation salt capable of ionizing or neutralizing the copolymer to the extent desired (i.e., from about 10% to 90%).

The base copolymer is made up of greater than 16% by weight of an alpha, beta-unsaturated carboxylic acid and an alpha-olefin. Optionally, a softening comonomer can be included in the copolymer. Generally, the alpha-olefin has from 2 to 10 carbon atoms and is preferably ethylene, and the unsaturated carboxylic acid is a carboxylic acid having from about 3 to 8 carbons. Examples of such acids include acrylic acid, methacrylic acid, ethacrylic acid, chloroacrylic acid, crotonic acid, maleic acid, fumaric acid, and itaconic acid, with acrylic acid being preferred.

The softening comonomer that can be optionally included in the inner cover layer for the golf ball of the invention may be selected from the group consisting of vinyl esters of aliphatic carboxylic acids wherein the acids have 2 to 10 carbon atoms, vinyl ethers wherein the alkyl groups contains 1 to carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

Consequently, examples of a number of copolymers suitable for use to produce the high acid ionomers included in the present invention include, but are not limited to, high acid embodiments of an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, etc. The base copolymer broadly contains greater than 16% by weight unsaturated carboxylic acid, from about 39 to about 83% by weight ethylene and from 0 to about 40% by weight of a softening comonomer. Preferably, the copolymer contains about 20% by weight unsaturated carboxylic acid and about 80% by weight ethylene. Most preferably, the copolymer contains about 20% acrylic acid with the remainder being ethylene.

Along these lines, examples of the preferred high acid base copolymers which fulfill the criteria set forth above, are a series of ethylene-acrylic copolymers which are commercially available from The Dow Chemical Company, Midland, Mich., under the "Primacor" designation. These high acid base copolymers exhibit the typical properties set forth below in Table 3.

mer with various amounts of the metal cation salts above the crystalline melting point of the copolymer, such as at a temperature from about 200° F. to about 500° F., preferably from about 250° F. to about 350° F. under high shear conditions at a pressure of from about 10 psi to 10,000 psi. Other well known blending techniques may also be used. The amount of metal cation salt utilized to produce the new metal cation neutralized high acid based ionomer resins is the quantity which provides a sufficient amount of the metal cations to neutralize the desired percentage of the carboxylic acid groups in the high acid copolymer. The extent of neutralization is generally from about 10% to about 90%.

As indicated below in Table 4 and more specifically in Example 1 in U.S. application Ser. No. 08/493,089, a number of new types of metal cation neutralized high acid ionomers can be obtained from the above indicated process. These include new high acid ionomer resins neutralized to various extents with manganese, lithium, potassium, calcium and nickel cations. In addition, when a high acid ethylene/acrylic acid copolymer is utilized as the base copolymer component of the invention and this component is subsequently neutralized to various extents with the metal cation salts producing acrylic acid based high acid ionomer resins neutralized with cations such as sodium, potassium, lithium, zinc, magnesium, manganese, calcium and nickel,

TABLE 3

Typical Properties of Primacor Ethylene-Acrylic Acid Copolymers

| GRADE | PERCENT ACID | DENSITY, g/cc | MELT INDEX, g/10 min | TENSILE YD. ST (psi) | FLEXURAL MODULUS (psi) | VICAT SOFT PT (° C.) | SHORE D HARDNESS |
|---|---|---|---|---|---|---|---|
| ASTM | | D-792 | D-1238 | D-638 | D-790 | D-1525 | D-2240 |
| 5980 | 20.0 | 0.958 | 300.0 | — | 4800 | 43 | 50 |
| 5990 | 20.0 | 0.955 | 1300.0 | 650 | 2600 | 40 | 42 |
| 5990 | 20.0 | 0.955 | 1300.0 | 650 | 3200 | 40 | 42 |
| 5981 | 20.0 | 0.960 | 300.0 | 900 | 3200 | 46 | 48 |
| 5981 | 20.0 | 0.960 | 300.0 | 900 | 3200 | 46 | 48 |
| 5983 | 20.0 | 0.958 | 500.0 | 850 | 3100 | 44 | 45 |
| 5991 | 20.0 | 0.953 | 2600.0 | 635 | 2600 | 38 | 40 |

[1]The Melt Index values are obtained according to ASTM D-1238, at 190° C.

Due to the high molecular weight of the Primacor 5981 grade of the ethylene-acrylic acid copolymer, this copolymer is the more preferred grade utilized in the invention.

The metal cation salts utilized in the invention are those salts which provide the metal cations capable of neutralizing, to various extents, the carboxylic acid groups of the high acid copolymer. These include acetate, oxide or hydroxide salts of lithium, calcium, zinc, sodium, potassium, nickel, magnesium, and manganese.

Examples of such lithium ion sources are lithium hydroxide monohydrate, lithium hydroxide, lithium oxide and lithium acetate. Sources for the calcium ion include calcium hydroxide, calcium acetate and calcium oxide. suitable zinc ion sources are zinc acetate dihydrate and zinc acetate, a blend of zinc oxide and acetic acid. Examples of sodium ion sources are sodium hydroxide and sodium acetate. Sources for the potassium ion include potassium hydroxide and potassium acetate. Suitable nickel ion sources are nickel acetate, nickel oxide and nickel hydroxide. Sources of magnesium include magnesium oxide, magnesium hydroxide, and magnesium acetate. Sources of manganese include manganese acetate and manganese oxide.

The new metal cation neutralized high acid ionomer resins are produced by reacting the high acid base copolymer with various amounts of the metal cation salts above the several new cation neutralized acrylic acid based high acid ionomer resins are produced.

TABLE 4

Metal Cation Neutralized High Acid Ionomers

| Formulation No. | Wt-% Cation Salt | Wt-% Neutralization | Melt Index | C.O.R. | Shore D Hardness |
|---|---|---|---|---|---|
| 1(NaOH) | 6.98 | 67.5 | 0.9 | .804 | 71 |
| 2(NaOH) | 5.66 | 54.0 | 2.4 | .808 | 73 |
| 3(NaOH) | 3.84 | 35.9 | 12.2 | .812 | 69 |
| 4(NaOH) | 2.91 | 27.0 | 17.5 | .812 | (brittle) |
| 5(MnAc) | 19.6 | 71.7 | 7.5 | .809 | 73 |
| 6(MnAc) | 23.1 | 88.3 | 3.5 | .814 | 77 |
| 7(MnAc) | 15.3 | 53.0 | 7.5 | .810 | 72 |
| 8(MnAc) | 26.5 | 106 | 0.7 | .813 | (brittle) |
| 9(LiOH) | 4.54 | 71.3 | 0.6 | .810 | 74 |
| 10(LiOH) | 3.38 | 52.5 | 4.2 | .818 | 72 |
| 11(LiOH) | 2.34 | 35.9 | 18.6 | .815 | 72 |
| 12(KOH) | 5.30 | 36.0 | 19.3 | Broke | 70 |
| 13(KOH) | 8.26 | 57.9 | 7.18 | .804 | 70 |
| 14(KOH) | 10.7 | 77.0 | 4.3 | .801 | 67 |
| 15(ZnAc) | 17.9 | 71.5 | 0.2 | .806 | 71 |
| 16(ZnAc) | 13.9 | 53.0 | 0.9 | .797 | 69 |
| 17(ZnAc) | 9.91 | 36.1 | 3.4 | .793 | 67 |

TABLE 4-continued

Metal Cation Neutralized High Acid Ionomers

| Formulation No. | Wt-% Cation Salt | Wt-% Neutralization | Melt Index | C.O.R. | Shore D Hardness |
|---|---|---|---|---|---|
| 18(MgAc) | 17.4 | 70.7 | 2.8 | .814 | 74 |
| 19(MgAc) | 20.6 | 87.1 | 1.5 | .815 | 76 |
| 20(MgAc) | 13.8 | 53.8 | 4.1 | .814 | 74 |
| 21(CaAc) | 13.2 | 69.2 | 1.1 | .813 | 74 |
| 22(CaAc) | 7.12 | 34.9 | 10.1 | .808 | 70 |
| 23(MgO) | 2.91 | 53.5 | 2.5 | .813 | |
| 24(MgO) | 3.85 | 71.5 | 2.8 | .808 | |
| 25(MgO) | 4.76 | 89.3 | 1.1 | .809 | |
| 26(MgO) | 1.96 | 35.7 | 7.5 | .815 | |
| 27(NiAc) | 13.04 | 61.1 | 0.2 | .802 | 71 |
| 28(NiAc) | 10.71 | 48.9 | 0.5 | .799 | 72 |
| 29(NiAc) | 8.26 | 36.7 | 1.8 | .796 | 69 |
| 30(NiAc) | 5.66 | 24.4 | 7.5 | .786 | 64 |

Controls: 50/50 Blend of Ioteks 8000/7030 C.O.R. = .810/65 Shore D Hardness
DuPont High Acid Surlyn ® 8422 (Na) C.O.R. = .811/70 Shore D Hardness
DuPont High Acid Surlyn ® 8162 (Zn) C.O.R. = .807/65 Shore D Hardness
Exxon High Acid Iotek EX-960 (Zn) C.O.R. = .796/65 Shore D Hardness
Control for Formulations 23–26 is 50/50 Iotek 8000/7030,
C.O.R. = .814, Formulation 26 C.O.R. was normalized to that control accordingly
Control for Formulation Nos. 27–30 is 50/50 Iotek 8000/7030, C.O.R. = .807

When compared to low acid versions of similar cation neutralized ionomer resins, the new metal cation neutralized high acid ionomer resins exhibit enhanced hardness, modulus and resilience characteristics. These are properties that are particularly desirable in a number of thermoplastic fields, including the field of golf ball manufacturing.

When utilized in the construction of the inner layer of a multi-layered golf ball, it has been found that the new acrylic acid based high acid ionomers extend the range of hardness beyond that previously obtainable while maintaining the beneficial properties (i.e. durability, click, feel, etc.) of the softer low acid ionomer covered balls, such as balls produced utilizing the low acid ionomers disclosed in U.S. Pat. Nos. 4,884,814 and 4,911,451.

Moreover, as a result of the development of a number of new acrylic acid based high acid ionomer resins neutralized to various extents by several different types of metal cations, such as manganese, lithium, potassium, calcium and nickel cations, several new ionomers or ionomer blends are now available for production of an inner cover layer of a multi-layered golf ball. By using these high acid ionomer resins, harder, stiffer inner cover layers having higher C.O.R.s, and thus longer distance, can be obtained.

More preferably, it has been found that when two or more of the above-indicated high acid ionomers, particularly blends of sodium and zinc high acid ionomers, are processed to produce the covers of multi-layered golf balls, (i.e., the inner cover layer herein) the resulting golf balls will travel further than previously known multi-layered golf balls produced with low acid ionomer resin covers due to the balls' enhanced coefficient of restitution values.

The low acid ionomers which may be suitable for use in formulating the inner layer compositions of several of the embodiments of the subject invention are ionic copolymers which are the metal, i.e., sodium, zinc, magnesium, etc., salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (i.e., iso- or n-butylacrylate, etc.) can also be included to produce a softer terpolymer. The carboxylic acid groups of the copolymer are partially neutralized (i.e., approximately 10–100%, preferably 30–70%) by the metal ions. Each of the low acid ionomer resins which may be included in the inner layer cover compositions of the invention contains 16% by weight or less of a carboxylic acid.

The inner layer compositions include the low acid ionomers such as those developed and sold by E. I. DuPont de Nemours & Company under the trademark "Surlyn®" and by Exxon Corporation under the trademark "Escor®" or tradename "Iotek," or blends thereof.

The low acid ionomer resins available from Exxon under the designation "Escor®" and/or "Iotek," are somewhat similar to the low acid ionomeric resins available under the "Surlyn®" trademark. However, since the Escor®/Iotek ionomeric resins are sodium or zinc salts of poly(ethylene-acrylic acid) and the "Surlyn®" resins are zinc, sodium, magnesium, etc. salts of poly(ethylene-methacrylic acid), distinct differences in properties exist.

When utilized in the construction of the inner layer of a multi-layered golf ball, it has been found that the low acid ionomer blends extend the range of compression and spin rates beyond that previously obtainable. More preferably, it has been found that when two or more low acid ionomers, particularly blends of sodium and zinc ionomers, are processed to produce the covers of multi-layered golf balls, (i.e., the inner cover layer herein) the resulting golf balls will travel further and at an enhanced spin rate than previously known multi-layered golf balls. Such an improvement is particularly noticeable in enlarged or oversized golf balls.

The use of an inner layer formulated from blends of lower acid ionomers produces multi-layer golf balls having enhanced compression and spin rates. These are the properties desired by the more skilled golfer.

In yet another embodiment of the inner cover layer, a blend of high and low acid ionomer resins is used. These can be the ionomer resins described above, combined in a weight ratio which preferably is within the range of 10:90 to 90:10 parts of high and low acid ionomer resins.

A further additional embodiment of the inner cover layer is primarily based upon the use of a fully non-ionomeric thermoplastic material. Suitable non-ionomeric materials include metallocene catalyzed polyolefins or polyamides, polyamide/ionomer blends, polyphenylene ether/ionomer blends, etc., which have a shore D hardness of at least 60 and a flex modulus of greater than about 30,000 psi, or other hardness and flex modulus values which are comparable to the properties of the ionomers described above. Other suitable materials include but are not limited to thermoplastic or thermosetting polyurethanes, a polyester elastomer such as that marketed by DuPont under the trademark Hytrel®, or a polyester amide such as that marketed by Elf Atochem S. A. under the trademark Pebax®, a blend of two or more non-ionomeric thermoplastic elastomers, or a blend of one or more ionomers and one or more non-ionomeric thermoplastic elastomers. These materials can be blended with the ionomers described above in order to reduce cost relative to the use of higher quantities of ionomer.

Outer Cover Layer

While the core components described herein, and the hard inner cover layer formed thereon, provide the multi-layer golf ball with power and distance, the outer cover layer 16, as shown in FIGS. 1 and 2, is comparatively softer than the inner cover layer. The softness provides for the feel and playability characteristics typically associated with balata or balata-blend balls. The outer cover layer or ply is comprised of a relatively soft, low modulus (about 1,000 psi to about 10,100 psi) and, in an alternate embodiment, low acid (less than 16 weight percent acid) ionomer, an ionomer blend, a non-ionomeric thermoplastic or thermosetting material such as, but not limited to, a metallocene catalyzed polyolefin such as EXACT material available from EXXON, a polyurethane, a polyester elastomer such as that marketed by DuPont under the trademark Hytrel®, or a polyester amide such as that marketed by Elf Atochem S. A. under the trademark Pebax®, a blend of two or more non-ionomeric thermoplastic or thermosetting materials, or a blend of one or more ionomers and one or more non-ionomeric thermoplastic materials. The outer layer is fairly thin (i.e. from about 0.010 to about 0.10 inches in thickness, more desirably 0.03 to 0.06 inches in thickness for a 1.680 inch ball and 0.04 to 0.07 inches in thickness for a 1.72 inch or more ball), but thick enough to achieve desired playability characteristics while minimizing expense. Thickness is defined as the average thickness of the non-dimpled areas of the outer cover layer. The outer cover layer, such as layer 16, has a Shore D hardness of 55 or less, and more preferably 50 or less. In some embodiments, the outer cover layer has a Shore D hardness of about 45 (i.e. a Shore C hardness of about 65).

In one embodiment, the outer cover layer preferably is formed from an ionomer which constitutes at least 75 weight % of an acrylate ester-containing ionic copolymer or blend of acrylate ester-containing ionic copolymers. This type of outer cover layer in combination with the core and inner cover layer described above results in golf ball covers having a favorable combination of durability and spin rate. The one or more acrylate ester-containing ionic copolymers each contain an olefin, an acrylate ester, and an acid. In a blend of two or more acrylate ester-containing ionic copolymers, each copolymer may contain the same or a different olefin, acrylate ester and acid than are contained in the other copolymers. Preferably, the acrylate ester-containing ionic copolymer or copolymers are terpolymers, but additional monomers can be combined into the copolymers if the monomers do not substantially reduce the scuff resistance or other good playability properties of the cover.

For a given copolymer, the olefin is selected from the group consisting of olefins having 2 to 8 carbon atoms, including, as non-limiting examples, ethylene, propylene, butene-1, hexene-1 and the like. Preferably the olefin is ethylene.

The acrylate ester is an unsaturated monomer having from 1 to 21 carbon atoms which serves as a softening comonomer. The acrylate ester preferably is methyl, ethyl, n-propyl, n-butyl, n-octyl, 2-ethylhexyl, or 2-methoxyethyl 1-acrylate, and most preferably is methyl acrylate or n-butyl acrylate. Another suitable type of softening comonomer is an alkyl vinyl ether selected from the group consisting of n-butyl, n-hexyl, 2-ethylhexyl, and 2-methoxyethyl vinyl ethers.

The acid is a mono- or dicarboxylic acid and preferably is selected from the group consisting of methacrylic, acrylic, ethacrylic, a-chloroacrylic, crotonic, maleic, fumaric, and itaconic acid, or the like, and half esters of maleic, fumaric and itaconic acid, or the like. The acid group of the copolymer is 10–100% neutralized with any suitable cation, for example, zinc, sodium, magnesium, lithium, potassium, calcium, manganese, nickel, chromium, tin, aluminum, or the like. It has been found that particularly good results are obtained when the neutralization level is about 50–100%.

The one or more acrylate ester-containing ionic copolymers each has an individual Shore D hardness of about 5–64. The overall Shore D hardness of the outer cover is 55 or less, and generally is 40–55. It is preferred that the overall Shore D hardness of the outer cover is in the range of 40–50 in order to impart particularly good playability characteristics to the ball.

The outer cover layer of the invention is formed over a core to result in a golf ball having a coefficient of restitution of at least 0.770, more preferably at least 0.780, and most preferably at least 0.790. The coefficient of restitution of the ball will depend upon the properties of both the core and the cover. The PGA compression of the golf ball is 100 or less, and preferably is 90 or less.

The acrylate ester-containing ionic copolymer or copolymers used in the outer cover layer can be obtained by neutralizing commercially available acrylate ester-containing acid copolymers such as polyethylene-methyl acrylate-acrylic acid terpolymers, including ESCOR ATX (Exxon Chemical Company) or poly (ethylene-butyl acrylate-methacrylic acid) terpolymers, including NUCREL (DuPont Chemical Company). Particularly preferred commercially available materials include ATX 320, ATX 325, ATX 310, ATX 350, and blends of these materials with NUCREL 010 and NUCREL 035. The acid groups of these materials and blends are neutralized with one or more of various cation salts including zinc, sodium, magnesium, lithium, potassium, calcium, manganese, nickel, etc. The degree of neutralization ranges from 10–100%. Generally, a higher degree of neutralization results in a harder and tougher cover material. The properties of non-limiting examples of commercially available un-neutralized acid terpolymers which can be used to form the golf ball outer cover layers of the invention are provided below in Table 5.

TABLE 5

Properties of Un-Neutralized Acid Terpolymers

| Trade Name | Melt Index dg/min ASTM D 1238 | Acid No. % KOH/g | Flex Modulus MPa (ASTM D790) | Hardness (Shore D) |
| --- | --- | --- | --- | --- |
| ATX 310 | 6 | 45 | 80 | 44 |
| ATX 320 | 5 | 45 | 50 | 34 |
| ATX 325 | 20 | 45 | 9 | 30 |
| ATX 350 | 6 | 15 | 20 | 28 |
| Nucrel 010 | 11 | 60 | 40 | 40 |
| Nucrel 035 | 35 | 60 | 59 | 40 |

The ionomer resins used to form the outer cover layers can be produced by reacting the acrylate ester-containing acid copolymer with various amounts of the metal cation salts at a temperature above the crystalline melting point of the copolymer, such as a temperature from about 200° F. to about 500° F., preferably from about 250° F. to about 350° F., under high shear conditions at a pressure of from about 100 psi to 10,000 psi. Other well known blending techniques may also be used. The amount of metal cation salt utilized to produce the neutralized ionic copolymers is the quantity which provides a sufficient amount of the metal cations to neutralize the desired percentage of the carboxylic acid groups in the high acid copolymer. When two or more different copolymers are to be used, the copolymers can be blended before or after neutralization. Generally, it is preferable to blend the copolymers before they are neutralized to provide for optimal mixing.

The compatibility of the acrylate ester-containing copolymers with each other in a copolymer blend produces a golf ball outer cover layer having a surprisingly good scuff resistance for a given hardness of the outer cover layer. The golf ball according to the invention has a scuff resistance of no higher than 3.0. It is preferred that the golf ball has a scuff resistance of no higher than about 2.5 to ensure that the golf ball is scuff resistant when used in conjunction with a variety of types of clubs, including sharp-grooved irons, which are particularly inclined to result in scuffing of golf ball covers. The best results according to the invention are obtained when the outer cover layer has a scuff resistance of no more than about 2.0.

Additional materials may also be added to the inner and outer cover layer of the present invention as long as they do not substantially reduce the playability properties of the ball. Such materials include dyes (for example, Ultramarine Blue sold by Whitaker, Clark, and Daniels of South Plainsfield, N.J.) (see U.S. Pat. No. 4,679,795, herein incorporated by reference), pigments such as titanium dioxide, zinc oxide, barium sulfate and zinc sulfate; UV absorbers; antioxidants; antistatic agents; and stabilizers. Moreover, the cover compositions of the present invention may also contain softening agents such as those disclosed in U.S. Pat. Nos. 5,312,857 and 5,306,760 both of which are herein incorporated by reference, including plasticizers, metal stearates, processing acids, etc., and reinforcing materials such as glass fibers and inorganic fillers, as long as the desired properties produced by the golf ball covers of the invention are not impaired.

The outer layer in another embodiment of the invention includes a blend of a soft (low acid) ionomer resin with a small amount of a hard (high acid) ionomer resin. A low modulus ionomer suitable for use in the outer layer blend has a flexural modulus measuring from about 1,000 to about 10,000 psi, with a hardness of about 20 to about 40 on the Shore D scale. A high modulus ionomer herein is one which measures from about 15,000 to about 70,000 psi as measured in accordance with ASTM method D-790. The hardness may be defined as at least 50 on the Shore D scale as measured in accordance with ASTM method D-2240.

Soft ionomers primarily are used in formulating the hard/soft blends of the cover compositions. These ionomers include acrylic acid and methacrylic acid based soft ionomers. They are generally characterized as comprising sodium, zinc, or other mono- or divalent metal cation salts of a terpolymer of an olefin having from about 2 to 8 carbon atoms, methacrylic acid, acrylic acid, or another, α, β-unsaturated carboxylic acid, and an unsaturated monomer of the acrylate ester class having from 1 to 21 carbon atoms. The soft ionomer is preferably made from an acrylic acid base polymer is an unsaturated monomer of the acrylate ester class.

Certain ethylene-acrylic acid based soft ionomer resins developed by the Exxon Corporation under the designation "Iotek 7520" (referred to experimentally by differences in neutralization and melt indexes as LDX 195, LDX 196, LDX 218 and LDX 219) may be combined with known hard ionomers such as those indicated above to produce the inner and outer cover layers. The combination produces higher C.O.R.s at equal or softer hardness, higher melt flow (which corresponds to improved, more efficient molding, i.e., fewer rejects) as well as significant cost savings versus the outer layer of multi-layer balls produced by other known hard-soft ionomer blends as a result of the lower overall raw materials cost and improved yields.

While the exact chemical composition of the resins to be sold by Exxon under the designation Iotek 7520 is considered by Exxon to be confidential and proprietary information, Exxon's experimental product data sheet lists the following physical properties of the ethylene acrylic acid zinc ionomer developed by Exxon:

TABLE 6

Physical Properties of Iotek 7520

| Property Value | ASTM Method | Units | Typical |
|---|---|---|---|
| Melt Index | D-1238 | g/10 min. | 2 |
| Density | D-1505 | kg/m$^3$ | 0.962 |
| Cation | | | Zinc |
| Melting Point | D-3417 | ° C. | 66 |
| Crystallization Point | D-3417 | ° C. | 49 |
| Vicat Softening Point | D-1525 | ° C. | 42 |
| Plaque Properties (2 mm thick Compression Molded Plaques) | | | |
| Tensile at Break | D-638 | MPa | 10 |
| Yield Point | D-638 | MPa | None |
| Elongation at Break | D-638 | % | 760 |
| 1% Secant Modulus | D-638 | MPa | 22 |
| Shore D Hardness | D-2240 | | 32 |
| Flexural Modulus | D-790 | MPa | 26 |
| Zwick Rebound | ISO 4862 | % | 52 |
| De Mattia Flex Resistance | D-430 | Cycles | >5000 |

In addition, test data indicates that Iotek 7520 resins have Short D hardnesses of about 32 to 36 (per ASTM D-2240), melt flow indexes of 3±0.5 g/10 min (at 190° C. per ASTM D-1288), and a flexural modulus of about 2500–3500 psi (per ASTM D-790). Furthermore, testing by an independent testing laboratory by pyrolysis mass spectrometry indicates that Iotek 7520 resins are generally zinc salts of a terpolymer of ethylene, acrylic acid, and methyl acrylate.

Furthermore, it has been found that a newly developed grade of an acrylic acid based soft ionomer available from the Exxon Corporation under the designation Iotek 7510 is also effective when combined with the hard ionomers indicated above in producing golf ball covers exhibiting higher C.O.R. values at equal or softer hardness than those produced by known hard-soft ionomer blends. In this regard, Iotek 7510 has the advantages (i.e. improved flow, higher C.O.R. values at equal hardness, increased clarity, etc.) produced by the Iotek 7520 resin when compared to the methacrylic acid base soft ionomers known in the art (such as the Surlyn® 8625 and Surlyn® 8629 combinations disclosed in U.S. Pat. No. 4,884,814).

In addition, Iotek 7510, when compared to Iotek 7520, produces slightly higher C.O.R. values at equal softness/hardness due to the Iotek 7510's higher hardness and neutralization. Similarly, Iotek 7510 produces better release properties (from the mold cavities) due to its slightly higher stiffness and lower flow rate than Iotek 7520. This is important in production where the soft covered balls tend to have lower yields caused by sticking in the molds and subsequent punched pin marks from the knockouts.

According to Exxon, Iotek 7510 is of similar chemical composition as Iotek 7520 (i.e. a zinc salt of a terpolymer of ethylene, acrylic acid, and methyl acrylate) but is more highly neutralized. Based upon FTIR analysis, Iotek 7520 is estimated to be about 30–40 wt.-% neutralized and Iotek 7510 is estimated to be about 40–60 wt.-% neutralized. The typical properties of Iotek 7510 in comparison of those of Iotek 7520 are set forth below:

TABLE 7

Physical Properties of Iotek 7510 in Comparison to Iotek 7520

|  | IOTEK 7520 | IOTEK 7510 |
|---|---|---|
| MI, g/10 min | 2.0 | 0.8 |
| Density, g/cc | 0.96 | 0.97 |
| Melting Point, °F. | 151 | 149 |
| Vicat Softening Point, °F. | 108 | 109 |
| Flex Modulus, psi | 3800 | 5300 |
| Tensile Strength, psi | 1450 | 1750 |
| Elongation, % | 760 | 690 |
| Hardness, Shore D | 32 | 35 |

The hard ionomer resins utilized to produce the outer cover layer composition hard/soft blends include ionic copolymers which are the sodium, zinc, magnesium, lithium, etc. salts of the reaction product of an olefin having from 2 to 8 carbon atoms and an unsaturated monocarboxylic acid having from 3 to 8 carbon atoms. The carboxylic acid groups of the copolymer may be totally or partially (i.e. approximately 15–75 percent) neutralized.

The hard ionomeric resins are likely copolymers of ethylene and acrylic and/or methacrylic acid, with copolymers of ethylene and acrylic acid being the most preferred. Two or more types of hard ionomeric resins may be blended into the outer cover layer compositions in order to produce the desired properties of the resulting golf balls.

As discussed earlier herein, the hard ionomeric resins introduced under the designation Escor® and sold under the designation "Iotek" are somewhat similar to the hard ionomeric resins sold under the Surlyn® trademark. However, since the "Iotek" ionomeric resins are sodium or zinc salts of poly(ethylene-acrylic acid) and the Surlyn® resins are zinc or sodium salts of poly(ethylene-methacrylic acid) some distinct differences in properties exist. As more specifically indicated in the data set forth below, the hard "Iotek" resins (i.e., the acrylic acid based hard ionomer resins) are the more preferred hard resins for use in formulating the outer layer blends for use in the present invention. In addition, various blends of "Iotek" and Surlyn® hard ionomeric resins, as well as other available ionomeric resins, may be utilized in the present invention in a similar manner.

Examples of commercially available hard ionomeric resins which may be used in the present invention in formulating the outer cover blends include the hard sodium ionic copolymer sold under the trademark Surlyn® 8940 and the hard zinc ionic copolymer sold under the trademark Surlyn® 9910. Surlyn® 8940 is a copolymer of ethylene with methacrylic acid and about 15 weight percent acid which is about 29 percent neutralized with sodium ions. This resin has an average melt flow index of about 2.8. Surlyn® 9910 is a copolymer of ethylene and methacrylic acid with about 15 weight percent acid which is about 58 percent neutralized with zinc ions. The average melt flow index of Surlyn® 9910 is about 0.7. The typical properties of Surlyn® 9910 and 8940 are set forth below in Table 8:

TABLE 8

Typical Properties of Commercially Available Hard Surlyn ® Resins Suitable for Use in the Outer Layer Blends of the Present Invention

|  | ASTM D | 8940 | 9910 | 8920 | 8528 | 9970 | 9730 |
|---|---|---|---|---|---|---|---|
| Cation Type |  | Sodium | Zinc | Sodium | Sodium | Zinc | Zinc |
| Melt flow index, gms/10 min. | D-1238 | 2.8 | 0.7 | 0.9 | 1.3 | 14.0 | 1.6 |
| Specific Gravity, g/cm³ | D-792 | 0.95 | 0.97 | 0.95 | 0.94 | 0.95 | 0.95 |
| Hardness, Shore D | D-2240 | 66 | 64 | 66 | 60 | 62 | 63 |
| Tensile Strength, (kpsi), MPa | D-638 | (4.8) 33.1 | (3.6) 24.8 | (5.4) 37.2 | (4.2) 29.0 | (3.2) 22.0 | (4.1) 28.0 |
| Elongation, % | D-638 | 470 | 290 | 350 | 450 | 460 | 460 |
| Flexural Modulus, (kpsi) MPa | D-790 | (51) 350 | (48) 330 | (55) 380 | (32) 220 | (28) 190 | (30) 210 |
| Tensile Impact (23° C.) KJ/m₂ (ft-lbs/in²) | D-1822S | 1020 (485) | 1020 (485) | 865 (410) | 1160 (550) | 760 (360) | 1240 (590) |
| Vicat Temperature, °C. | D-1525 | 63 | 62 | 58 | 73 | 61 | 73 |

Examples of the more pertinent acrylic acid based hard ionomer resin suitable for use in the present outer cover composition sold under the "Iotek" trade name by the Exxon Corporation include Iotek 8000, 8010, 8020, 8030, 7030, 7010, 7020, 1002, 1003, 959 and 960. The physical properties of Iotek 959 and 960 are shown above. The typical properties of the remainder of these and other Iotek hard ionomers suited for use in formulating the outer layer cover composition are set forth below in Table 9:

TABLE 9

Typical Properties of Iotek Ionomers

| | ASTM Method | Units | 4000 | 4010 | 8000 | 8020 | 8030 |
|---|---|---|---|---|---|---|---|
| Resin Properties | | | | | | | |
| Cation type | | | zinc | zinc | sodium | sodium | sodium |
| Melt index | D-1238 | g/10 min. | 2.5 | 1.5 | 0.8 | 1.6 | 2.8 |
| Density | D-1505 | kg/m$^3$ | 963 | 963 | 954 | 960 | 960 |
| Melting Point | D-3417 | ° C. | 90 | 90 | 90 | 87.5 | 87.5 |
| Crystallization Point | D-3417 | ° C. | 62 | 64 | 56 | 53 | 55 |
| Vicat Softening Point | D-1525 | ° C. | 62 | 63 | 61 | 64 | 67 |
| % Weight Acrylic Acid | | | | 16 | | 11 | |
| % of Acid Groups cation neutralized | | | | 30 | | 40 | |
| Plaque Properties (3 mm thick, compression molded) | | | | | | | |
| Tensile at break | D-638 | MPa | 24 | 26 | 36 | 31.5 | 28 |
| Yield point | D-638 | MPa | none | none | 21 | 21 | 23 |
| Elongation at break | D-638 | % | 395 | 420 | 350 | 410 | 395 |
| 1% Secant modulus | D-638 | MPa | 160 | 160 | 300 | 350 | 390 |
| Shore Hardness D | D-2240 | — | 55 | 55 | 61 | 58 | 59 |
| Film Properties (50 micron film 2.2:1 Blow-up ratio) | | | | | | | |
| Tensile at Break MD | D-882 | MPa | 41 | 39 | 42 | 52 | 47.4 |
| TD | D-882 | MPa | 37 | 38 | 38 | 38 | 40.5 |
| Yield point MD | D-882 | MPa | 15 | 17 | 17 | 23 | 21.6 |
| TD | D-882 | MPa | 14 | 15 | 15 | 21 | 20.7 |
| Elongation at Break MD | D-882 | % | 310 | 270 | 260 | 295 | 305 |
| TD | D-882 | % | 360 | 340 | 280 | 340 | 345 |
| 1% Secant modulus MD | D-882 | MPa | 210 | 215 | 390 | 380 | 380 |
| TD | D-882 | MPa | 200 | 225 | 380 | 350 | 345 |
| Dart Drop Impact | D-1709 | g/micron | 12.4 | 12.5 | 20.3 | | |

| | ASTM Method | Units | 7010 | 7020 | 7030 |
|---|---|---|---|---|---|
| Resin Properties | | | | | |
| Cation type | | | zinc | zinc | zinc |
| Melt Index | D-1238 | g/10 min. | 0.8 | 1.5 | 2.5 |
| Density | D-1505 | kg/m$^3$ | 960 | 960 | 960 |
| Melting Point | D-3417 | ° C. | 90 | 90 | 90 |
| Crystallization Point | D-3417 | ° C. | — | — | — |
| Vicat Softening Point | D-1525 | ° C. | 60 | 63 | 62.5 |
| % Weight Acrylic Acid | | | — | — | — |
| % of Acid Groups Cation Neutralized | | | — | — | — |
| Plaque Properties (3 mm thick, compression molded) | | | | | |
| Tensile at break | D-638 | MPa | 38 | 38 | 38 |
| Yield Point | D-638 | MPa | none | none | none |
| Elongation at break | D-638 | % | 500 | 420 | 395 |
| 1% Secant modulus | D-638 | MPa | — | — | — |
| Shore Hardness D | D-2240 | — | 57 | 55 | 55 |

It has been determined that when hard/soft ionomer blends are used for the outer cover layer, good results are achieved when the relative combination is in a range of about 3–25 percent hard ionomer and about 75–97 percent soft ionomer.

Moreover, in alternative embodiments, the outer cover layer formulation may also comprise up to 100 wt % of a soft, low modulus non-ionomeric thermoplastic material including a polyester polyurethane such as B. F. Goodrich Company's Estane® polyester polyurethane X-4517. The non-ionomeric thermoplastic material may be blended with a soft ionomer. For example, polyamides blend well with soft ionomer. According to B. F. Goodrich, Estane® X-4517 has the following properties set forth below in Table 10:

TABLE 10

Properties of Estane ® X-4517

| | |
|---|---|
| Tensile | 1430 |
| 100% | 815 |
| 200% | 1024 |
| 300% | 1193 |
| Elongation | 641 |
| Youngs Modulus | 1826 |
| Hardness A/D | 88/39 |
| Bayshore Rebound | 59 |
| Solubility in Water | Insoluble |
| Melt processing temperature | >350° F. (>177° C.) |
| Specific Gravity ($H_2O$ = 1) | 1.1–1.3 |

Other soft, relatively low modulus non-ionomeric thermoplastic elastomers may also be utilized to produce the outer cover layer as long as the non-ionomeric thermoplastic elastomers produce the playability and durability characteristics desired without adversely effecting the enhanced travel distance characteristic produced by the high acid ionomer resin composition. These include, but are not limited to thermoplastic polyurethanes such as Texin thermoplastic polyurethanes from Mobay Chemical Co. and the Pellethane thermoplastic polyurethanes from Dow Chemical Co.; non-ionomeric thermoset polyurethanes including but not limited to those disclosed in U.S. Pat. No. 5,334,673, herein incorporated by reference; cross-linked metallocene catalyzed polyolefins; ionomer/rubber blends such as those in Spalding U.S. Pat. Nos. 4,986,545; 5,098,105 and 5,187,013, all of which are herein incorporated by reference; and, Hytrel polyester elastomers from DuPont and Pebax polyesteramides from Elf Atochem S.A.

Filler Agent

As shown in FIGS. 1 and 2, the inner cover layer 14 surrounds the core 10. The inner cover layer 14 may be the only inner cover layer for the ball or may be one of two or more inner cover layers. The inner cover layer 14 contains a resin composition with at least 50 parts by weight, more preferably at least 75 parts by weight, and most preferably at least 90 parts by weight of a non-ionomeric polyolefin based upon 100 parts by weight of the resin composition used in the inner cover layer(s). A non-ionomeric polyolefin according to the invention is a polyolefin which is not a copolymer of an olefin, such as ethylene or another olefin having from 2 to 8 carbon atoms, and a metal salt of an unsaturated monocarboxylic acid, such as acrylic acid, methacrylic acid or another unsaturated monocarboxylic acid having from 3 to 8 carbon atoms. The inner cover layer 14 also contains at least one part by weight of a filler based upon 100 parts by weight of the resin composition. The filler preferably is used to adjust the density, flex modulus, mold release, and/or melt flow index of the inner cover layer. More preferably, at least when the filler is for adjustment of density or flex modulus, it is present in an amount of at least five parts by weight based upon 100 parts by weight of the resin composition. With some fillers, up to about 200 parts by weight probably can be used. A density adjusting filler according to the invention preferably is a filler which has a specific gravity which is at least 0.05 and more preferably at least 0.1 higher or lower than the specific gravity of the resin composition. Particularly preferred density adjusting fillers have specific gravities which are higher than the specific gravity of the resin composition by 0.2 or more, even more preferably by 2.0 or more. A flex modulus adjusting filler according to the invention is a filler which, when used in an amount of, e.g. 1–100 parts by weight based upon 100 parts by weight of resin composition, will raise or lower the flex modulus (ASTM D-790) of the resin composition by at least 1% and preferably at least 5% as compared to the flex modulus of the resin composition without the inclusion of the flex modulus adjusting filler. A mold release adjusting filler is a filler which allows for easier removal of part from mold, and eliminates or reduces the need for external release agents which otherwise could be applied to the mold. A mold release adjusting filler typically is used in an amount of up to about 2 wt % based upon the total weight of the inner cover layer. A melt flow index adjusting filler is a filler which increases or decreases the melt flow, or ease of processing of the composition.

The inner cover layer, outer cover layer and core may contain coupling agents that increase adhesion of materials within a particular layer e.g. to couple a filler to a resin composition, or between adjacent layers. Non-limiting examples of coupling agents include titanates, zirconates and silanes. Coupling agents typically are used in amounts of 0.1–2 wt % based upon the total weight of the composition in which the coupling agent is included.

It is not necessary that the inner cover layer 14 contribute to the C.O.R. of the ball. In fact, the covered core may have a C.O.R. that is somewhat lower than the C.O.R. of the central core. The degree to which the inner cover layer 14 can slightly reduce C.O.R. of the core 10 will depend upon the thickness of the outer cover layer 16 and the degree to which the outer cover layer 16 contributes to C.O.R. To enable a broad range of outer cover layer materials to be used, it is preferred that the inner cover layer 14 result in no more than a 0.5–10% reduction in the C.O.R. for the core when covered with the inner cover layer, as compared to the C.O.R. of the core 10 alone.

A density adjusting filler is used to control the moment of inertia, and thus the initial spin rate of the ball and spin decay. The addition of a filler with a lower specific gravity than the resin composition results in a decrease in moment of inertia and a higher initial spin rate than would result if no filler were used. The addition of a filler with a higher specific gravity than the resin composition results in an increase in moment of inertia and a lower initial spin rate. High specific gravity fillers are preferred as less volume is used to achieve the desired inner cover total weight. Non-reinforcing fillers are also preferred as they have minimal effect on C.O.R. Preferably, the filler does not chemically react with the resin composition to a substantial degree, although some reaction may occur when, for example, zinc oxide is used in a cover layer which contains some ionomer.

The density-increasing fillers for use in the invention preferably have a specific gravity in the range of 1.0–20. The density-reducing fillers for use in the invention preferably have a specific gravity of 0.06–1.4, and more preferably 0.06–0.90. The flex modulus increasing fillers have a reinforcing or stiffening effect due to their morphology, their interaction with the resin, or their inherent physical properties. The flex modulus reducing fillers have an opposite effect due to their relatively flexible properties compared to the matrix resin. The melt flow index increasing fillers have a flow enhancing effect due to their relatively high melt flow versus the matrix. The melt flow index decreasing fillers have an opposite effect due to their relatively low melt flow index versus the matrix.

Fillers which may be employed in the inner cover layer may be or are typically in a finely divided form, for example, in a size generally less than about 20 mesh, preferably less than about 100 mesh U.S. standard size, except for fibers and flock, which are generally elongated. Flock and fiber sizes should be small enough to facilitate processing. Filler particle size will depend upon desired effect, cost, ease of addition, and dusting considerations. The filler preferably is selected from the group consisting of precipitated hydrated silica, clay, talc, asbestos, glass fibers, aramid fibers, mica, calcium metasilicate, barium sulfate, zinc sulfide, lithopone, silicates, silicon carbide, diatomaceous earth, polyvinyl chloride, carbonates, metals, metal alloys, tungsten carbide, metal oxides, metal stearates, particulate carbonaceous materials, micro balloons, and combinations thereof. Non-limiting examples of suitable fillers, their densities, and their preferred uses are as follows in Table 11:

TABLE 11

| Filler Type | Spec. Grav. | Comments |
|---|---|---|
| Precipitated hydrated silica | 2.0 | 1,2 |
| Clay | 2.62 | 1,2 |
| Talc | 2.85 | 1,2 |
| Asbestos | 2.5 | 1,2 |
| Glass fibers | 2.55 | 1,2 |
| Aramid fibers (KEVLAR ®) | 1.44 | 1,2 |
| Mica | 2.8 | 1,2 |
| Calcium metasilicate | 2.9 | 1,2 |
| Barium sulfate | 4.6 | 1,2 |
| Zinc sulfide | 4.1 | 1,2 |
| Lithopone | 4.2–4.3 | 1,2 |
| Silicates | 2.1 | 1,2 |
| Silicon carbide platelets | 3.18 | 1,2 |
| Silicon carbide whiskers | 3.2 | 1,2 |
| Tungsten carbide | 15.6 | 1 |
| Diatomaceous earth | 2.3 | 1,2 |
| Polyvinyl chloride | 1.41 | 1,2 |
| Carbonates | | |
| Calcium carbonate | 2.71 | 1,2 |
| Magnesium carbonate | 2.20 | 1,2 |
| Metals and Alloys (powders) | | |
| Titanium | 4.51 | 1 |
| Tungsten | 19.35 | 1 |
| Aluminum | 2.70 | 1 |
| Bismuth | 9.78 | 1 |
| Nickel | 8.90 | 1 |
| Molybdenum | 10.2 | 1 |
| Iron | 7.86 | 1 |
| Steel | 7.8–7.9 | 1 |
| Lead | 11.4 | 1,2 |
| Copper | 8.94 | 1 |
| Brass | 8.2–8.4 | 1 |
| Boron | 2.34 | 1 |
| Boron carbide whiskers | 2.52 | 1,2 |
| Bronze | 8.70–8.74 | 1 |
| Cobalt | 8.92 | 1 |
| Beryllium | 1.84 | 1 |
| Zinc | 7.14 | 1 |
| Tin | 7.31 | 1 |
| Metal Oxides | | |
| Zinc oxide | 5.57 | 1,2 |
| Iron oxide | 5.1 | 1,2 |
| Aluminum oxide | 4.0 | |
| Titanium oxide | 3.9–4.1 | 1,2 |
| Magnesium oxide | 3.3–3.5 | 1,2 |
| Zirconium oxide | 5.73 | 1,2 |
| Metal Stearates | | |
| Zinc stearate | 1.09 | 3,4 |
| Calcium stearate | 1.03 | 3,4 |
| Barium stearate | 1.23 | 3,4 |
| Lithium stearate | 1.01 | 3,4 |
| Magnesium stearate | 1.03 | 3,4 |

TABLE 11-continued

| Filler Type | Spec. Grav. | Comments |
|---|---|---|
| Particulate carbonaceous materials | | |
| Graphite | 1.5–1.8 | 1,2 |
| Carbon black | 1.8 | 1,2 |
| Natural bitumen | 1.2–1.4 | 1,2 |
| Cotton flock | 1.3–1.4 | 1,2 |
| Cellulose flock | 1.15–1.5 | 1,2 |
| Leather fiber | 1.2–1.4 | 1,2 |
| Micro balloons | | |
| Glass | 0.15–1.1 | 1,2 |
| Ceramic | 0.2–0.7 | 1,2 |
| Fly ash | 0.6–0.8 | 1,2 |
| Coupling Agents Adhesion Promoters | | |
| Titanates | 0.95–1.17 | |
| Zirconates | 0.92–1.11 | |
| Silane | 0.95–1.2 | |

COMMENTS:
1 Particularly useful for adjusting density of the inner cover layer.
2 Particularly useful for adjusting flex modulus of the inner cover layer.
3 Particularly useful for adjusting old release of the inner cover layer.
4 Particularly useful for increasing melt flow index of the inner cover layer.
All fillers except for metal stearates would be expected to reduce the melt flow index of the inner cover layer.

The amount of filler employed is primarily a function of weight requirements and distribution.

Dual and Triple Cores

As noted, the present invention golf balls may utilize a unique dual core configuration. Preferably, the cores comprise (i) an interior spherical center component formed from a thermoset material, a thermoplastic material, or combinations thereof and (ii) a core layer disposed about the spherical center component, the core layer formed from a thermoset material, a thermoplastic material, or combinations thereof. Most preferably, the core layer is disposed immediately adjacent to, and in intimate contact with the center component. The cores may further comprise (iii) an optional outer core layer disposed about the core layer. Most preferably, the outer core layer is disposed immediately adjacent to, and in intimate contact with the core layer. The outer core layer may be formed from a thermoset material, a thermoplastic material, or combinations thereof. As noted, the term dual core as used herein refers to core assemblies comprising components (i) and (ii). And, the term triple core as used herein refers to core assemblies comprising components (i), (ii), and (iii).

Figure 3:
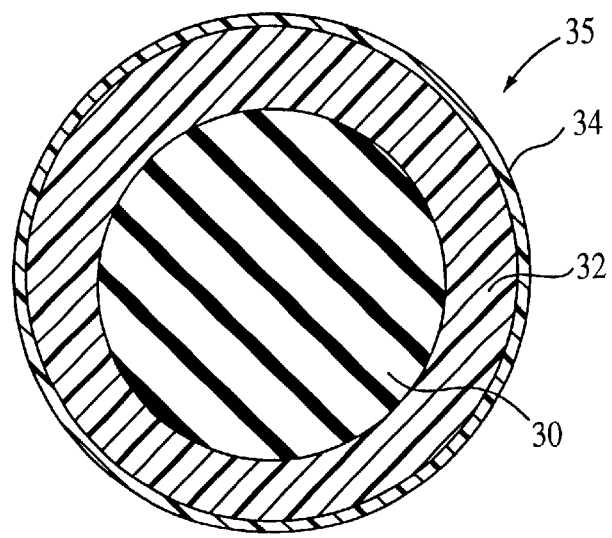
FIG. 3 is a cross-sectional view of another preferred embodiment golf ball in accordance with the present invention comprising a dual core component.

The present invention provides several additionally preferred embodiment golf balls utilizing the unique dual core configuration and the previously described cover layers. Referring to FIG. 3, a preferred embodiment golf ball 35 is illustrated comprising a core 30 formed from a thermoset material surrounded by a core layer 32 formed from a thermoplastic material. A multi-layer cover 34 surrounds the core 30 and core layer 32. The multi-layer cover 34 preferably corresponds to the previously described multi-layer cover 12.

Figure 4:
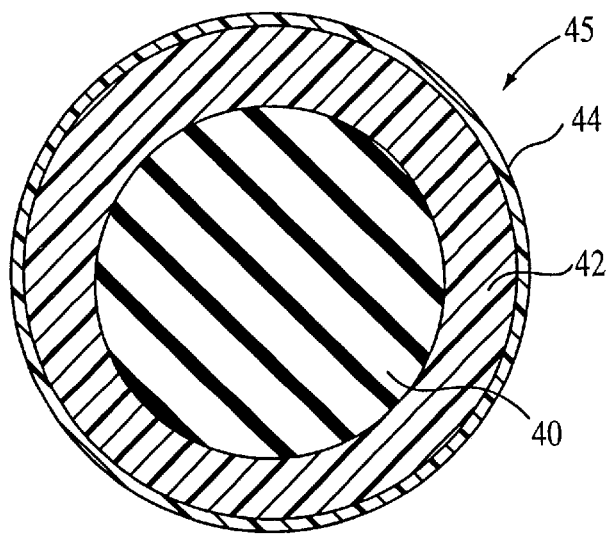
FIG. 4 is a cross-sectional view of yet another preferred embodiment golf ball in accordance with the present invention comprising a dual core component.

As illustrated in FIG. 4, another preferred embodiment golf ball 45 in accordance with the present invention is illustrated. The preferred embodiment golf ball 45 comprises a core 40 formed from a thermoplastic material surrounded by a core layer 42. The core layer 42 is formed from a thermoset material. A multi-layer cover 44 surrounds the core 40 and the core layer 42. Again, the multi-layer cover 44 preferably corresponds to the previously described multi-layer cover 12.

Figure 5:
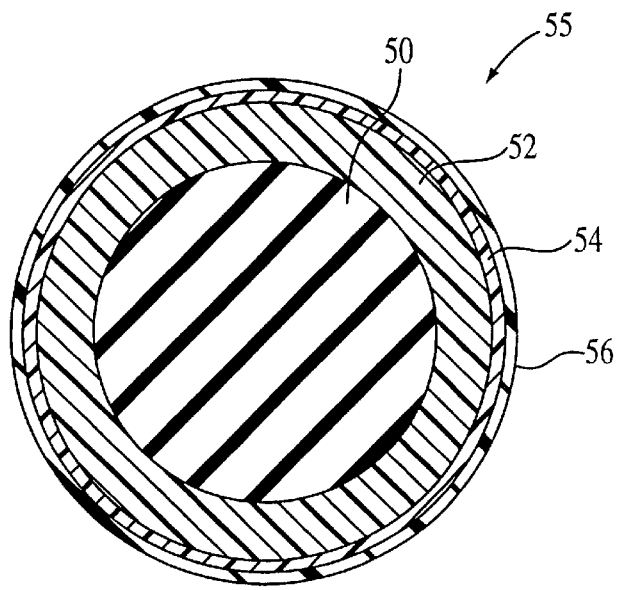
FIG. 5 is a cross-sectional view of another preferred embodiment golf ball in accordance with the present invention comprising a dual core component and an outer core layer.

FIG. 5 illustrates yet another preferred embodiment golf ball 55 in accordance with the present invention. The preferred embodiment golf ball 55 comprises a core 50 formed from a thermoplastic material. A core layer 52 surrounds the core 50. The core layer 52 is formed from a thermoplastic material which may be the same as the material utilized with the core 50, or one or more other or different thermoplastic materials. The preferred embodiment golf ball 55 utilizes an optional outer core layer 54 that surrounds the core component 50 and the core layer 52. The outer core layer 54 is formed from a thermoplastic material which may be the same or different than any of the thermoplastic materials utilized by the core 50 and the core layer 52. The golf ball 55 further comprises a multi-layer cover 56 that is preferably similar to the previously described multi-layer cover 12.

Figure 6:
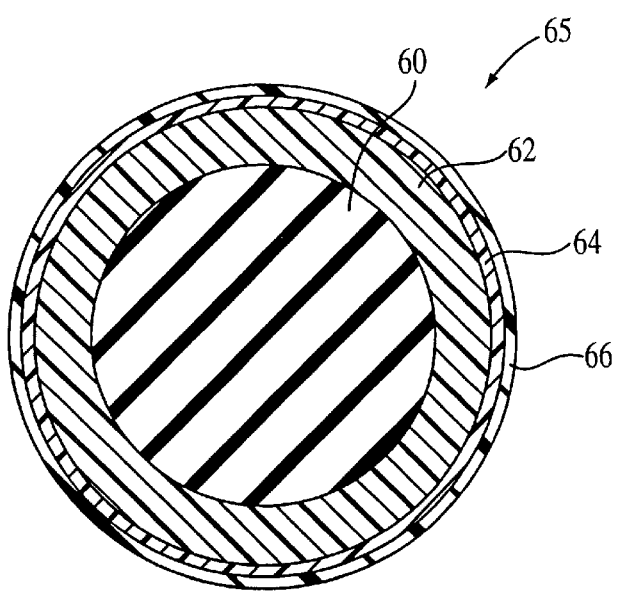
FIG. 6 is a cross-sectional view of yet another preferred embodiment golf ball in accordance with the present invention comprising a dual core component and an outer core layer.

FIG. 6 illustrates yet another preferred embodiment golf ball 65 in accordance with the present invention. The preferred embodiment golf ball 65 comprises a core 60 formed from a thermoplastic, thermoset material, or any combination of a thermoset and thermoplastic material. A core layer 62 surrounds the core 60. The core layer 62 is formed from a thermoset material. The preferred embodiment golf ball 65 also comprises an optional outer core layer 64 formed from a thermoplastic material. A multi-layer cover 66, preferably similar to the previously described multi-layer cover 12, is disposed about, and generally surrounds, the core 60, the core layer 62 and the outer core layer 64.

A wide array of thermoset materials can be utilized in the present invention dual cores and triple cores. Examples of suitable thermoset materials include butadiene or any natural or synthetic elastomer, including metallocene polyolefins, polyurethanes, silicones, polyamides, polyureas, or virtually any irreversibly cross-linked resin system. It is also contemplated that epoxy, phenolic, and an array of unsaturated polyester resins could be utilized.

The thermoplastic material utilized in the present invention golf balls and, particularly their dual cores, may be nearly any thermoplastic material. Examples of typical thermoplastic materials for incorporation in the golf balls of the present invention include, but are not limited to, ionomers, polyurethane thermoplastic elastomers, and combinations thereof. It is also contemplated that a wide array of other thermoplastic materials could be utilized, such as polysulfones, fluoropolymers, polyamide-imides, polyarylates, polyaryletherketones, polyaryl sulfones/polyether sulfones, polybenzimidazoles, polyether-imides, polyimides, liquid crystal polymers, polyphenylene sulfides; and specialty high-performance resins, which would include fluoropolymers, polybenzimidazole, and ultrahigh molecular weight polyethylenes.

Additional examples of suitable thermoplastics include metallocenes, polyvinyl chlorides, acrylonitrile-butadiene-styrenes, acrylics, styrene-acrylonitriles, styrene-maleic anhydrides, polyamides (nylons), polycarbonates, polybutylene terephthalates, polyethylene terephthalates, polyphenylene ethers/polyphenylene oxides, reinforced polypropylenes, and high-impact polystyrenes.

Preferably, the thermoplastic materials have relatively high melting points, such as a melting point of at least about 300° F. Several examples of these preferred thermoplastic materials and which are commercially available include, but are not limited to, Capron (a blend of nylon and ionomer), Lexan polycarbonate, Pebax, and Hytrel. The polymers or resin system may be cross-linked by a variety of means such as by peroxide agents, sulphur agents, radiation or other cross-linking techniques.

Any or all of the previously described components in the cores of the golf ball of the present invention may be formed in such a manner, or have suitable fillers added, so that their resulting density is decreased or increased. For example, any of these components in the dual cores could be formed or otherwise produced to be light in weight. For instance, the components could be foamed, either separately or in-situ. Related to this, a foamed light weight filler agent may be added. In contrast, any of these components could be mixed with or otherwise receive various high density filler agents or other weighting components such as relatively high density fibers or particulate agents in order to increase their mass or weight.

The following commercially available thermoplastic resins are particularly preferred for use in the noted dual cores employed in the golf balls of the present invention: Capron 8351 (available from Allied Signal Plastics), Lexan ML5776 (from General Electric), Pebax 3533 (a polyether block amide from Elf Atochem), and Hytrel G4074 (from DuPont). Properties of these four preferred thermoplastics are set forth below in Tables 12–15. When forming a golf ball in accordance with the present invention, if the interior center component of the dual core is to comprise a thermoplastic material, it is most preferred to utilize Pebax thermoplastic resin.

TABLE 12

CAPRON 8351

|  | DAM | 50% RH | ASTM Test |
|---|---|---|---|
| MECHANICAL | | | |
| Tensile Strength, Yield, psi (MPa) | 7,800 (54) | — | D-638 |
| Flexural Strength, psi (MPa) | 9,500 (65) | — | D-790 |
| Flexural Modulus, psi (MPa) | 230,000 (1,585) | — | D-790 |
| Ultimate Elongation, % | 200 | — | D-638 |
| Notched Izod Impact, ft-lbs/in (J/M) | No Break | — | D-256 |
| Drop Weight Impact, ft-lbs (J) | 150 (200) | — | D-3029 |
| Drop Weight Impact, @ −40° F., ft-lbs (J) | 150 (200) | — | D-3029 |
| PHYSICAL | | | |
| Specific Gravity | 1.07 | — | D-792 |
| THERMAL | | | |
| Melting Point, ° F. (° C.) | 420 (215) | — | D-789 |
| Heat Deflection @ 264 psi ° F. (° C.) | 140 (60) | — | D-648 |

TABLE 13

Lexan ML5776

| PROPERTY | TYPICAL DATA | UNIT | METHOD |
|---|---|---|---|
| MECHANICAL | | | |
| Tensile Strength, yield, Type I, 0.125" | 8500 | psi | ASTM D 638 |
| Tensile Strength, break, Type I, 0.125" | 9500 | psi | ASTM D 638 |
| Tensile Elongation, yield, Type I, 0.125" | 110.0 | % | ASTM D 638 |
| Flexural Strength, yield, 0.125" | 12000 | psi | ASTM D 790 |
| Flexural Modulus, 0.125" | 310000 | psi | ASTM D 790 |
| IMPACT | | | |
| Izod Impact, unnotched, 73 F. | 60.0 | ft-lb/in | ASTM D 4812 |
| Izod Impact, notched, 73 F. | 15.5 | ft-lb/in | ASTM D 256 |
| Izod Impact, notches 73 F., 0.250" | 12.0 | ft-lb/in | ASTM D 256 |
| Instrumented Impact Energy @ Peak, 73 F. | 48.0 | ft-lbs | ASTM D 3763 |
| THERMAL | | | |
| HDT, 264 psi, 0.250", unannealed | 257 | deg F. | ASTM D 648 |
| Thermal Index, Elec Prop | 80 | deg C. | UL 7468 |
| Thermal Index, Mech Prop with Impact | 80 | deg C. | UL 7468 |
| Thermal Index, Mech Prop without Impact | 80 | deg C. | UL 7468 |
| PHYSICAL | | | |
| Specific Gravity, solid | 1.19 | — | ASTM D 792 |
| Water Absorption, 24 hours @ 73 F. | 0.150 | % | ASTM D 570 |
| Mold Shrinkage, flow, 0.125" | 5.7 | in/in E-3 | ASTM D 955 |
| Melt Flow Rate, nom'l, 300 C./1.2 kgf(0) | 7.5 | g/10 min | ASTM D 1238 |
| FLAME CHARACTERISTICS | | | |
| UL File Number, USA | E121562 | — | — |
| 94HB Rated (tested thickness) | 0.060 | inch | UL94 |

TABLE 14

PEBAX ® RESINS

| PROPERTY | ASTM TEST METHOD | UNITS | 3533 |
|---|---|---|---|
| Specific Gravity | D792 | | |
| Water Absorption Equilibrium (20° C., 50% R.H.>) | | | 0.5 |
| 24 Hr. Immersion | D570 | | 1.2 |
| Hardness | D2240 | | 35D |
| Tensile Strength, Ultimate | D638 | psi | 5600 |
| Elongation, Ultimate | D638 | % | 580 |
| Flexural Modulus | D790 | psi | 2800 |
| Izod Impact, Notched | D256 | ft-lb./in. | |
| 20° C. | | | NB |
| −40° C. | | | NB |
| Abrasion Resistance H18/1000 g | D1044 | Mg/1000 Cycles | 104 |
| Tear Resistance Notched | D624C | lb./in. | 260 |
| Melting Point | D3418 | ° F. | 306 |
| Vicat Softening Point | D1525 | ° F. | 165 |
| HDT 66 psi | D648 | ° F. | 115 |
| Compression Set (24 hr., 160° F.) | D395A | % | 54 |

TABLE 15

HYTREL G4074
Thermoplastic Elastomer

| PHYSICAL | | |
|---|---|---|
| Dens/Sp Gr | ASTM D792 | 1.1800 sp gr 23/23 C. |
| Melt Flow | ASTM D1238 | 5.20 @E - 190 C./2.16 kg g/10/min |
| Wat Abs | ASTM D570 | 2.100% |

TABLE 15-continued

HYTREL G4074
Thermoplastic Elastomer

| MECHANICAL | | |
|---|---|---|
| Elong@Brk | ASTM D638 | 230.0% |
| Flex Mod | ASTM D790 | 9500 psi |
| TnStr@Brk | ASTM D638 | 2000 psi |
| IMPACT | | |
| Notch Izod | ASTM D256 | No Break @ 73.0 F. @0.2500 inft-lb/in |
| | | 0.50 @ −40.0 F. @0.2500 inft-lb/in |
| HARDNESS | | |
| Shore | ASTM D2240 | 40 Shore D |
| THERMAL | | |
| DTUL@66 | ASTM D648 | 122 F. |
| Melt Point | | 338.0 F. |
| Vicat Soft | ASTM D1525 | 248 F. |
| Melt Point | | |

The dual and triple cores of the inventive golf balls typically have a coefficient of restitution of about 0.750 or more, more preferably 0.770 or more and a PGA compression of about 90 or less, and more preferably 70 or less. The cores have a weight of 25–40 grams and preferably 30–40 grams. The core can be compression molded from a slug of uncured or lightly cured elastomer composition comprising a high cis content polybutadiene and a metal salt of an α, β, ethylenically unsaturated carboxylic acid such as zinc mono- or diacrylate or methacrylate. In order to achieve higher coefficients of restitution and/or to increase hardness in the core, the manufacturer may include a small amount of a metal oxide such as zinc oxide. In addition, larger amounts of metal oxide than are needed to achieve the desired coefficient may be included in order to increase the core weight so that the finished ball more closely approaches the U.S.G.A. upper weight limit of 1.620 ounces. Non-limiting examples of other materials which may be used in the core composition include compatible rubbers or ionomers, and low molecular weight fatty acids such as stearic acid. Free radical initiator catalysts such as peroxides are admixed with the core composition so that on the application of heat and pressure, a curing or cross-linking reaction takes place.

Cellular Core

The preferred embodiment golf ball may comprise a cellular core comprising a material having a porous or cellular configuration. Suitable materials for a cellular core include, but are not limited to, foamed elastomeric materials such as, for example, crosslinked polybutadiene/ZDA mixtures, polyurethanes, polyolefins, ionomers, metallocenes, polycarbonates, nylons, polyesters, and polystyrenes. Preferred materials include polybutadiene/ZDA mixtures, ionomers, and metallocenes. The most preferred materials are foamed crosslinked polybutadiene/ZDA mixtures.

The shape and configuration of the foamed core is spherical. The diameter of the cellular core typically ranges from about 1.340 inches to about 1.638 inches, and most preferably from about 1.500 inches to about 1.540 inches. It is generally preferred that the core, be immediately adjacent to, and thus next to, the inner surface of either the metal mantle layer or the polymeric hollow sphere.

If the cellular core is used in conjunction with a metal mantle, the selection of the type of metal for the mantle will determine the size and density for the cellular core. A hard, high modulus metal will require a relatively thin mantle so that ball compression is not too hard. If the mantle is relatively thin, the ball may be too light in weight so a cellular core will be required to add weight and, further, to add resistance to oil canning or deformation of the metal mantle. In contrast, a solid core would likely also add too much weight to the finished ball and, therefore, a cellular core is preferred to provide proper weight and resilience.

The weight of the cellular core can be controlled by the cellular density. The cellular core typically has a specific gravity of from about 0.10 to about 1.0. The coefficient of restitution of the cellular core should be at least 0.500.

The structure of the cellular core may be either open or closed cell. It is preferable to utilize a closed cell configuration with a solid surface skin that can be metallized or receive a conductive coating. The preferred cell size is that required to obtain an apparent specific gravity of from about 0.10 to about 1.0.

In a preferred method, a cellular core is fabricated and a metallic cover applied over the core. The metallic cover may be deposited by providing a conductive coating or layer about the core and electroplating one or more metals on that coating to the required thickness. Alternatively, two metallic half shells can be welded together and a flowable cellular material, for example a foam, or a cellular core material precursor, injected through an aperture in the metallic sphere using a two component liquid system that forms a semi-rigid or rigid material or foam. The fill hole in the metal mantle may be sealed to prevent the outer cover stock from entering into the cellular core during cover molding.

If the cellular core is prefoamed or otherwise formed prior to applying the metallic layer, the blowing agent may be one or more conventional agents that release a gas, such as nitrogen or carbon dioxide. Suitable blowing agents include, but are not limited to, azodicarbonamide, N,N-dinitrosopentamethylene-tetramine, 4-4 oxybis (benzenesulfonyl-hydrazide), and sodium bicarbonate. The preferred blowing agents are those that produce a fine closed cell structure forming a skin on the outer surface of the core.

A cellular core may be encapsulated or otherwise enclosed by the metal mantle, for instance by affixing two hemispherical halves of a metal shell together about a cellular core. It is also contemplated to introduce a foamable cellular core material precursor within a hollow spherical metal mantle and subsequently foaming that material in situ.

In yet another variant embodiment, an optional polymeric hollow sphere, such as for example, the hollow sphere substrate, may be utilized to receive a cellular material. One or more metal mantle layers, such as metal mantle layers, can then be deposited or otherwise disposed about the polymeric sphere. If such a polymeric sphere is utilized in conjunction with a cellular core, it is preferred that the core material be introduced into the hollow sphere as a flowable material. Once disposed within the hollow sphere, the material may foam and expand in volume to the shape and configuration of the interior of the hollow sphere.

Figure 8:
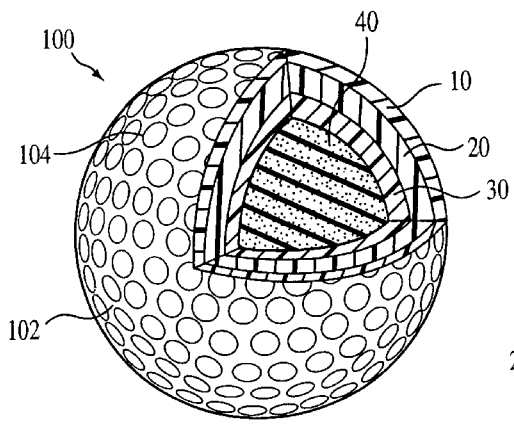
FIG. 8 is a partial cross-sectional view of another preferred embodiment golf ball in accordance with the present invention, comprising a polymeric outer cover, one or more metal mantle layers, an optional polymeric hollow sphere substrate, and a cellular core.

FIG. 8 illustrates a preferred embodiment golf ball 100 in accordance with the present invention. It will be understood that the referenced drawings are not necessarily to scale. The preferred embodiment golf ball 100 comprises an outermost polymeric outer cover 10, one or more metal mantle layers 20, an innermost polymeric hollow sphere substrate 30, and a cellular core 40. The golf ball 100 provides a plurality of dimples 104 defined along an outer surface 102 of the golf ball 200.

Figure 9:
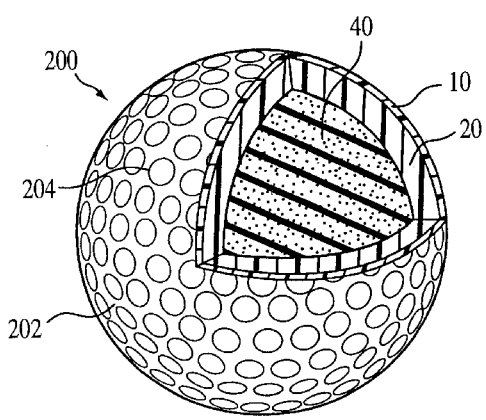
FIG. 9 is a partial cross-sectional view of another preferred embodiment golf ball in accordance with the present invention, the golf ball comprising a polymeric outer cover, one or more metal mantle layers, and a cellular core.

FIG. 9 illustrates preferred embodiment golf ball 200 in accordance with the present invention. The golf ball 200 comprises an outermost polymeric outer cover 10, one or more metal mantle layers 20, and a cellular core 40. The preferred embodiment golf ball 200 provides a plurality of dimples 204 defined along the outer surface 202 of the ball 200.

Figure 10:
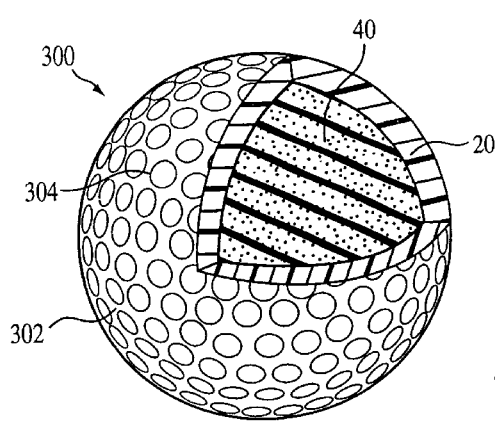
FIG. 10 is a partial cross-sectional view of another preferred embodiment golf ball in accordance with the present invention, the golf ball comprising one or more metal mantle layers and a cellular core.

FIG. 10 illustrates preferred embodiment golf ball 300 in accordance with the present invention. The golf ball 300 comprises one or more metal mantle layers 20, and a cellular core 40. The golf ball 300 provides a plurality of dimples 304 defined along the outer surface 302 of the golf ball 300.

Figure 11:
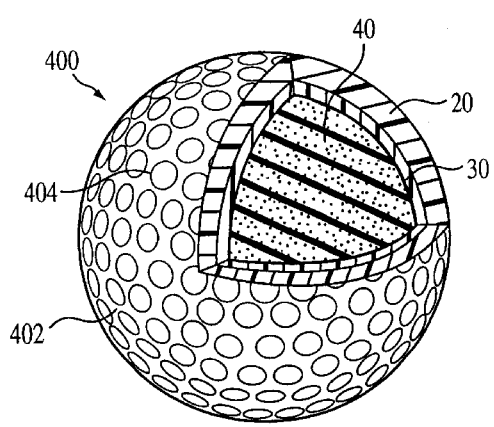
FIG. 11 is partial cross-sectional view of another preferred embodiment golf ball in accordance with the present invention, the golf ball comprising one or more metal mantle layers, an optional polymeric hollow sphere substrate, and a cellular core.

FIG. 11 illustrates a preferred embodiment golf ball 400 in accordance with the present invention. The golf ball 400 comprises one or more metal mantle layers 20, an optional polymeric hollow sphere substrate 30, and a cellular core 40. The golf ball 400 provides a plurality of dimples 404 defined along the outer surface 402 of the golf ball 400.

Liquid Core

As noted, the preferred embodiment golf ball may include a liquid core. In one variant, the liquid filled core disclosed in U.S. Pat. Nos. 5,480,155 and 5,150,906, both herein incorporated by reference, is suitable. Suitable liquids for use in the present invention golf balls include, but are not limited to, water, alcohol, oil, combinations of these, solutions such as glycol and water, or salt and water. Other suitable liquids include oils or colloidal suspensions, such as clay, barytes, or carbon black in water or other liquid. A preferred liquid core material is a solution of inorganic salt in water. The inorganic salt is preferably calcium chloride. The preferred glycol is glycerine.

The most inexpensive liquid is a salt water solution. All of the is liquids noted in the previously-mentioned, '155 and '906 patents are suitable. The density of the liquid can be adjusted to achieve the desired final weight of the golf ball.

The most preferred technique for forming a ball having a liquid core is to form a thin, hollow polymeric sphere by blow molding or forming two half shells and then joining the two half shells together. The hollow sphere is then filled with a suitable liquid and sealed. These techniques are described in the '155 and '906 patents.

The liquid filled sphere is then preferably metallized, such as via electroplating, to a suitable thickness of from about 0.001 inches to about 0.050 inches. The resulting metal mantle may further receive one or more other metal mantle layers. The metallized sphere is then optionally covered with a polymeric dimpled cover by injection or compression molding and then finished using conventional methods.

A liquid core is preferable over a solid core in that it develops less spin initially and has greater spin decay resulting in a lower trajectory with increased total distance.

Figure 12:
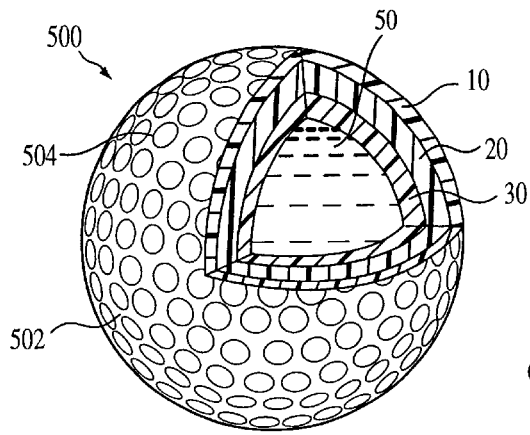
FIG. 12 is a partial cross-sectional view of another preferred embodiment golf ball in accordance with the present invention, comprising a polymeric outer cover, one or more metal mantle layers, an optional polymeric hollow sphere substrate, and a liquid core.

FIG. 12 illustrates a preferred embodiment golf ball 500 in accordance with the present invention. The preferred embodiment golf ball 500 comprises an outermost polymeric outer cover 10, one or more metal mantle layers 20, an innermost polymeric hollow sphere substrate 30, and a liquid core 50. The golf ball 500 provides a plurality of dimples 504 defined along an outer surface 502 of the golf ball 500.

Figure 13:
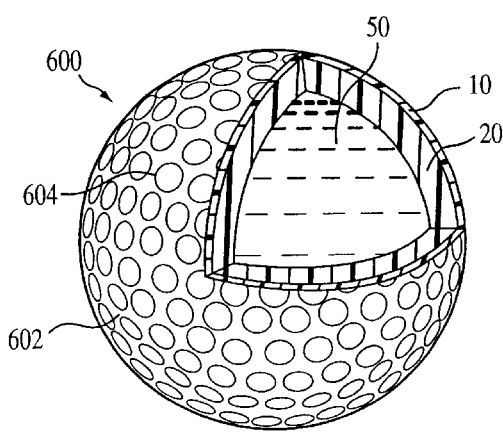
FIG. 13 is a partial cross-sectional view of another preferred embodiment golf ball in accordance with the present invention, the golf ball comprising a polymeric outer cover, one or more metal mantle layers, and a liquid core.

FIG. 13 illustrates another preferred embodiment golf ball 600 in accordance with the present invention. The golf ball 600 comprises an outermost polymeric outer cover 10, one or more metal mantle layers 20, and a liquid core 50. The sixth preferred embodiment golf ball 600 provides a plurality of dimples 604 defined along the outer surface 602 of the ball 600.

Figure 14:
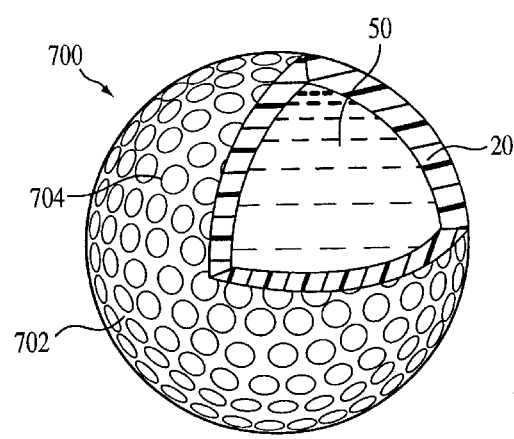
FIG. 14 is a partial cross-sectional view of another preferred embodiment golf ball in accordance with the present invention, the golf ball comprising one or more metal mantle layers and a liquid core.

FIG. 14 illustrates another preferred embodiment golf ball 700 in accordance with the present invention. The golf ball 700 comprises one or more metal mantle layers 20 and a liquid core 50. The golf ball 700 provides a plurality of dimples 704 defined along the outer surface 702 of the golf ball 700.

Figure 15:
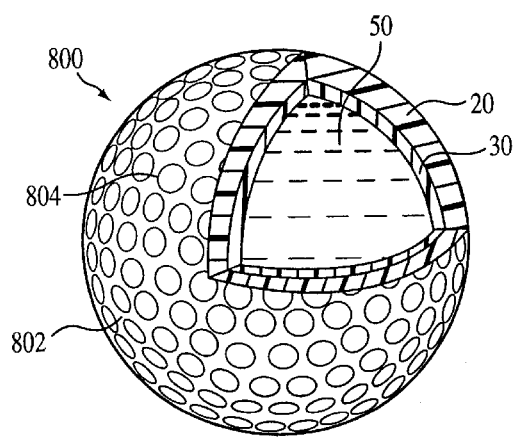
FIG. 15 is partial cross-sectional view of another preferred embodiment golf ball in accordance with the present invention, the golf ball comprising one or more metal mantle layers, an optional polymeric hollow sphere substrate, and a liquid core.

FIG. 15 illustrates yet another preferred embodiment golf ball 800 in accordance with the present invention. The golf ball 800 comprises one or more metal mantle layers 20, an optional polymeric hollow sphere substrate and a liquid core 50. The golf ball 800 provides a plurality of dimples 804 defined along the outer surface 802 of the golf ball 800.

Wound Cores

Wound cores are generally produced by winding a very long elastic thread around a solid or liquid filled balloon center. The elastic thread is wound around the center to produce a finished core of about 1.4 to 1.6 inches in diameter, generally. However, the preferred embodiment golf balls of the present invention preferably utilize a solid core, or rather a solid dual core configuration, as opposed to a wound core.

A wide array of wound core configurations may be utilized such as for example, those disclosed in U.S. Pat. Nos. 5,346,223; 5,340,112; 5,037,104; 5,007,594; 4,938, 471; 4,783,078; and 4,272,079, all of which are hereby incorporated by reference.

Optional Polymeric Sphere

A wide array of polymeric materials can be utilized to form the thin hollow sphere or shell as referred to herein and generally depicted in the accompanying drawings as the sphere 30. Thermoplastic materials are generally preferred for use as materials for the shell. Typically, such materials should exhibit good flowability, moderate stiffness, high abrasion resistance, high tear strength, high resilience, and good mold release, among others.

Synthetic polymeric materials which may be used for the thin hollow sphere include homopolymeric and copolymer materials which may include: (1) Vinyl resins formed by the polymerization of vinyl chloride, or by the copolymerization of vinyl chloride with vinyl acetate, acrylic esters or vinylidene chloride; (2) Polyolefins such as polyethylene, polypropylene, polybutylene, and copolymers such as polyethylene methylacrylate, polyethylene ethylacrylate, polyethylene vinyl acetate, polyethylene methacrylic or polyethylene acrylic acid or polypropylene acrylic acid or terpolymers made from these and acrylate esters and their metal ionomers, polypropylene/EPDM grafted with acrylic acid or anhydride modified polyolefins; (3) Polyurethanes, such as are prepared from polyols and diisocyanates or polyisocyanates; (4) Polyamides such as poly (hexamethylene adipamide) and others prepared from diamines and dibasic acids, as well as those from amino acid such as poly(caprolactam), and blends of polyamides with SURLYN, polyethylene, ethylene copolymers, EDPA, etc; (5) Acrylic resins and blends of these resins with polyvinyl chloride, elastomers, etc.; (6) Thermoplastic rubbers such as the urethanes, olefinic thermoplastic rubbers such as blends of polyolefins with EPDM, block copolymers of styrene and butadiene, or isoprene or ethylene-butylene rubber, polyether block amides; (7) Polyphenylene oxide resins, or blends of polyphenylene oxide with high impact polystyrene; (8) Thermoplastic polyesters, such as PET, PBT, PETG, and elastomers sold under the trademark HYTREL by E. I. DuPont De Nemours & Company of Wilmington, Del.; (9) Blends and alloys including polycarbonate with ABS, PBT, PET, SMA, PE elastomers, etc. and PVC with ABS or EVA or other elastomers; and (10) Blends of thermoplastic rubbers with polyethylene, polypropylene, polyacetal, nylon, polyesters, cellulose esters, etc.

It is also within the purview of this invention to add to the compositions employed for the thin hollow shell agents which do not affect the basic characteristics of the shell. Among such materials are antioxidants, antistatic agents, and stabilizers.

Other Aspects of Preferred Embodiment Ball Construction

Additional materials may be added to the outer cover, such as cover 10, including dyes (for example, Ultramarine Blue sold by Whitaker, Clark and Daniels of South Plainsfield, N.J.) (see U.S. Pat. No. 4,679,795 herein incorporated by reference); pigments such as titanium dioxide, zinc oxide, barium sulfate and zinc sulfate; UV absorbers; antioxidants; antistatic agents; and stabilizers. Further, the cover compositions may also contain softening agents, such as plasticizers, processing aids, etc. and reinforcing material such as glass fibers and inorganic fillers, as long as the desired properties produced by the golf ball covers are not impaired.

The outer cover layer may be produced according to conventional melt blending procedures. In the case of the outer cover layer, when a blend of hard and soft, low acid ionomer resins are utilized, the hard ionomer resins are blended with the soft ionomeric resins and with a masterbatch containing the desired additives in a Banbury mixer, two-roll mill, or extruder prior to molding. The blended composition is then formed into slabs and maintained in such a state until molding is desired. Alternatively, a simple dry blend of the pelletized or granulated resins and color masterbatch may be prepared and fed directly into an injection molding machine where homogenization occurs in the mixing section of the barrel prior to injection into the mold. If necessary, further additives such as an inorganic filler, etc., may be added and uniformly mixed before initiation of the molding process. A similar process is utilized to formulate the high acid ionomer resin compositions.

In place of utilizing a single outer cover, a plurality of cover layers may be employed. For example, an inner cover can be formed about the metal mantle, and an outer cover then formed about the inner cover. The thickness of the inner and outer cover layers are governed by the thickness parameters for the overall cover layer. The inner cover layer is preferably formed from a relatively hard material, such as, for example, the previously described high acid ionomer resin. The outer cover layer is preferably formed from a relatively soft material having a low flexural modulus.

In the event that an inner cover layer and an outer cover layer are utilized, these layers can be formed as follows. An inner cover layer may be formed by injection molding or compression molding an inner cover composition about a metal mantle to produce an intermediate golf ball having a diameter of about 1.50 to 1.67 inches, preferably about 1.620 inches. The outer layer is subsequently molded over the inner layer to produce a golf ball having a diameter of 1.680 inches or more.

In compression molding, the inner cover composition is formed via injection at about 380° F. to about 450° F. into smooth surfaced hemispherical shells which are then positioned around the mantle in a mold having the desired inner cover thickness and subjected to compression molding at 200° to 300° F. for about 2 to 10 minutes, followed by cooling at 50° to 70° F. for about 2 to 7 minutes to fuse the shells together to form a unitary intermediate ball. In addition, the intermediate balls may be produced by injection molding wherein the inner cover layer is injected directly around the mantle placed at the center of an intermediate ball mold for a period of time in a mold temperature of from 50° F. to about 100° F. Subsequently, the outer cover layer is molded about the core and the inner layer by similar compression or injection molding techniques to form a dimpled golf ball of a diameter of 1.680 inches or more.

After molding, the golf balls produced may undergo various further processing steps such as buffing, painting and marking as disclosed in U.S. Pat. No. 4,911,451 herein incorporated by reference.

The resulting golf ball produced from the high acid ionomer resin inner layer and the relatively softer, low flexural modulus outer layer exhibits a desirable coefficient of restitution and durability properties while at the same time offering the feel and spin characteristics associated with soft balata and balata-like covers of the prior art.

In yet another embodiment, a metal shell is disposed along the outermost periphery of the golf ball and hence, provides an outer metal surface. Similarly, a metal shell may be deposited on to a dimpled molded golf ball. The previously described metal mantle may be used without a polymeric outer cover, and so, provide a golf ball with an outer metal surface. Providing a metal outer surface produces a scuff resistant, cut resistant, and very hard surface ball. Furthermore, positioning a relatively dense and heavy metal shell about the outer periphery of a golf ball produces a relatively low spinning, long distance ball. Moreover, the high moment of inertia of such a ball will promote long rolling distances.

Method of Making Golf Ball

In preparing golf balls in accordance with the present invention, a hard inner cover layer is molded (by injection molding or by compression molding) about a core (preferably a solid core, and most preferably a dual core). A comparatively softer outer layer is molded over the inner layer.

The dual cores of the present invention are preferably formed by compression molding techniques. However, it is fully contemplated that liquid injection molding or transfer molding techniques could be utilized.

Figure 7:
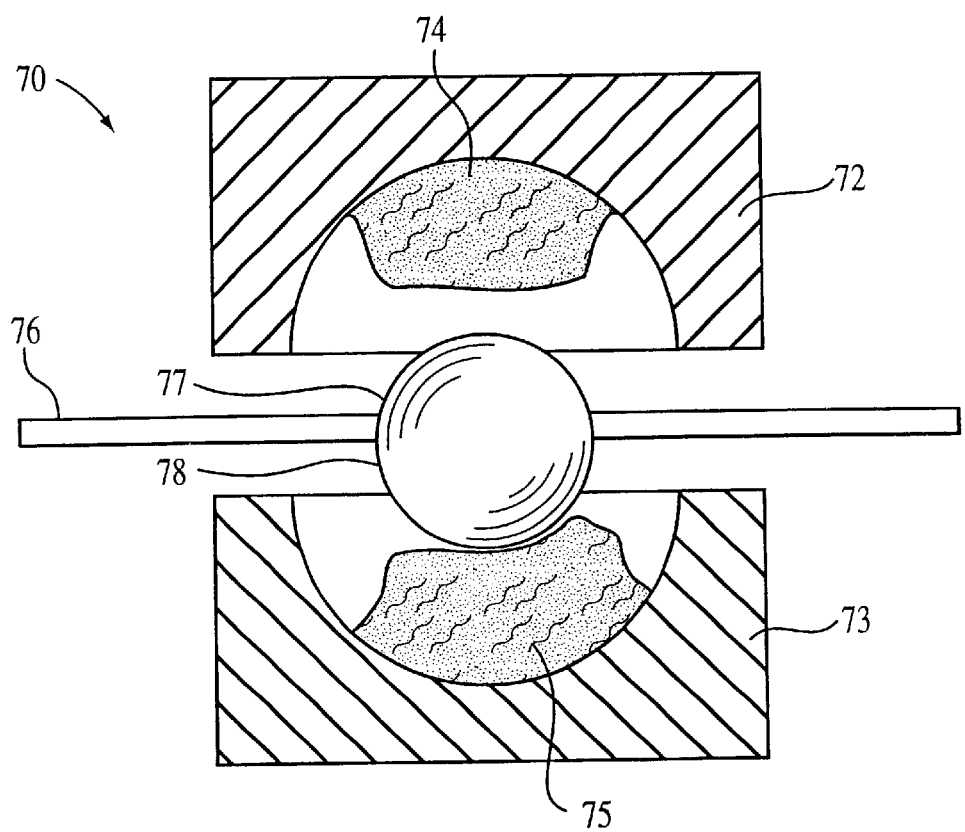
FIG. 7 is a schematic view of an assembly used for molding a preferred embodiment golf ball in accordance with the present invention.

For purposes of example, a preferred method of making the golf ball 45 depicted in FIG. 4 is as follows. Specifically, a thermoset material, i.e. a core layer 42, is formed about an inner core component 40 comprising a thermoplastic material as follows: Referring to FIG. 7, preforms 75 of a thermoset material, i.e. utilized to form the core layer 42, are preheated in an oven for one-half hour at 170° F. and placed in the bottom 73 of a molding assembly 70. A Teflon-coated plate 76 with two hemispheres 77 and 78, each about 0.840 inches in diameter, is placed on top of the preforms. Additional preforms, preheated as described above, are placed in the corresponding cavities of a top mold 72. The bottom mold 73 is engaged with the top mold 72 and the assembly flipped or otherwise inverted. The bottom one half of the mold assembly 70 then becomes the top one half of the mold assembly. The mold assembly 70 is then placed in a press and cold formed at room temperature using approximately 10 tons of pressure in a steam press. The molding assembly 70 is closed for approximately two minutes and pressure released. The molding assembly 70 is then opened and the Teflon plate 76 is removed thereby leaving one or more essentially perfectly formed one-half shells in cavities in the thermoset material. Previously formed thermoplastic core centers are then placed in the bottom cavities and the top portion 72 of the molding assembly 70 is placed on the bottom 73 and the materials disposed therebetween cured. The golf ball produced by this method had an inner core diameter of 0.840 inches in diameter. The outer core diameter had a final diameter of 1.470 inches, and a pre-mold diameter of 1.490 inches. A relatively hard inner cover layer is then molded about the resulting dual core component. The diameter of the inner cover was 1.570 inches. A comparatively softer outer cover layer is then molded about the inner cover layer. The outer cover diameter was 1.680 inches. Details of molding the inner and outer covers are set forth below.

Four golf balls in accordance with the present invention were formed, each using a preferred and commercially available high melting point thermoplastic material as an inner core component. Table 16, set forth below, summarizes these balls.

TABLE 16

| | | Capron 8351 | Lexan ML 5776–7539 | Pebax 3533 | Hytrel G-4074 | Control (Single Core) |
|---|---|---|---|---|---|---|
| Inner Core | size (inches) | 0.835 | 0.854 | 0.840 | 0.831 | — |
| | weight (grams) | 5.33 | 6.14 | 5.08 | 5.81 | — |
| | rebound % (100") | 78 | 83 | 65 | 61 | — |
| | Shore C (surface) | — | — | 57 | 73 | — |
| | Shore D (surface) | 75 | 83 | 36 | 47 | — |
| Outer Core Formulation | Cis 1,4 Polybutadiene | 100 | 100 | 100 | 100 | 100 |
| | Zinc oxide | 27 | 26 | 28 | 21 | 25 |
| | Zinc stearate | 16 | 16 | 16 | 16 | 25 |
| | Zinc diacrylate | 20 | 20 | 24 | 24 | 18 |
| | 231 × L | 0.9 | 0.9 | 0.9 | 0.9 | 0.9 |
| | | 163.9 | 162.9 | 168.9 | 161.9 | 158.9 |
| Double Core Properties | size (inches) | 1.561 | 1.560 | 1.562 | 1.563 | 1.562 |
| | weight (grams) | 37.7 | 37.8 | 37.8 | 37.5 | 37.8 |
| | compression (Riehle) | 79 | 80 | 99 | 93 | 114 |
| | C.O.R. | .689 | .603 | .756 | .729 | .761 |
| Molded Ball Properties | size (inches | 1.685 | 1.683 | 1.682 | 1.683 | 1.685 |
| | weight (grams) | 45.3 | 45.5 | 45.5 | 45.2 | 45.4 |
| | compression (Riehle) | 78 | 80 | 89 | 87 | 102 |
| | C.O.R. | .750 | .667 | .785 | .761 | .788 |
| Cover Stock (used on all above balls) | Surlyn 8940 | 22 | *T.G. MB Iotek 7030 | | 75.35 | |
| | Surlyn 9910 | 54.5 | Unitane 0–110 | | 23.9 | |
| | Surlyn 8320 | 10 | Ultra Marine Blue | | 0.46 | |
| | Surlyn 8120 | 4 | Eastonbrite OB-1 | | | |
| | T.B. MB* | 9.5 | Santonox R | | 0.038 | |
| | | 100.0 | | | 100.00 | |

Generally, the inner cover layer which is molded over the core, or preferably a dual core component, is about 0.01 inches to about 0.10 inches in thickness, preferably about 0.03–0.07 inches thick. The inner ball which includes the core and inner cover layer preferably has a diameter in the range of 1.25 to 1.60 inches. The outer cover layer is about 0.01 inches to about 0.10 inches in thickness. Together, the core, the inner cover layer and the outer cover layer combine to form a ball having a diameter of 1.680 inches or more, the minimum diameter permitted by the rules of the United States Golf Association and weighing no more than 1.62 ounces.

Most preferably, the resulting golf balls in accordance with the present invention have the following dimensions as set forth below in Table 17:

TABLE 17

| Size Specifications: | | Preferred | Most Preferred |
|---|---|---|---|
| Inner Core | - Max. | 1.250" | 1.00" |
| | - Min. | 0.500" | 0.70" |
| Outer Core | - Max. | 1.600" | 1.570" |
| | - Min. | 1.500" | 1.550" |
| (1) Cover Thickness (Total) | | | |
| | - Max. | 0.090" | 0.065" |
| | - Min. | 0.040" | 0.055" |

In a particularly preferred embodiment of the invention, the golf ball has a dimple pattern which provides coverage of 65% or more. The golf ball typically is coated with a durable, abrasion-resistant, relatively non-yellowing finish coat.

The various cover composition layers of the present invention may be produced according to conventional melt blending procedures. Generally, the copolymer resins are blended in a Banbury type mixer, two-roll mill, or extruder prior to neutralization. After blending, neutralization then occurs in the melt or molten states in the banbury mixer. Mixing problems are minimal because preferably more than 75 wt %, and more preferably at least 80 wt % of the ionic copolymers in the mixture contain acrylate esters and, in this respect, most of the polymer chains in the mixture are similar to each other. The blended composition is then formed into slabs, pellets, etc., and maintained in such a state until molding is desired. Alternatively, a simple dry blend of the pelletized or granulated resins which have previously been neutralized to a desired extent and colored masterbatch may be prepared and fed directly into the injection molding machine where homogenization occurs in the mixing section of the barrel prior to injection into the mold. If necessary, further additives such as an inorganic filler, etc., may be added and uniformly mixed before initiation of the molding process. A similar process is utilized to formulate the high acid ionomer resin compositions used to produce the inner cover layer. In one embodiment of the invention, a masterbatch of non-acrylate ester-containing ionomer with pigments and other additives incorporated therein is mixed with the acrylate ester-containing copolymers in a ratio of about 1–7 weight % masterbatch and 93–99 weight % acrylate ester-containing copolymer.

The golf balls of the present invention can be produced by molding processes which include but are not limited to those which are currently well known in the golf ball art. For example, the golf balls can be produced by injection molding or compression molding the novel cover compositions around a wound or solid molded core to produce an inner ball which typically has a diameter of about 1.50 to 1.67 inches. The core, preferably of a dual core configuration, may be formed as previously described. The outer layer is subsequently molded over the inner layer to produce a golf ball having a diameter of 1.620 inches or more, preferably about 1.680 inches or more. Although either solid cores or wound cores can be used in the present invention, as a result of their lower cost and superior performance solid molded cores are preferred over wound cores. The standards for both the minimum diameter and maximum weight of the balls are established by the United States Golf Association (U.S.G.A.).

In compression molding, the inner cover composition is formed via injection at about 380° F. to about 450° F. into smooth surfaced hemispherical shells which are then positioned around the core in a mold having the desired inner cover thickness and subjected to compression molding at 200 to 300° F. for about 2 to 10 minutes, followed by cooling at 50 to 70° F. for about 2 to 7 minutes to fuse the shells together to form a unitary intermediate ball. In addition, the intermediate balls may be produced by injection molding wherein the inner cover layer is injected directly around the core placed at the center of an intermediate ball mold for a period of time in a mold temperature of from 50 to about 100° F. Subsequently, the outer cover layer is molded around the core and the inner layer by similar compression or injection molding techniques to form a dimpled golf ball of a diameter of 1.680 inches or more.

After molding, the golf balls produced may undergo various further processing steps such as buffing, painting and marking as disclosed in U.S. Pat. No. 4,911,451, herein incorporated by reference.

The resulting golf ball produced from the hard inner layer and the relatively softer, low flexural modulus outer layer provide for an improved multi-layer golf ball having a unique dual core configuration which provides for desirable coefficient of restitution and durability properties while at the same time offering the feel and spin characteristics associated with soft balata and balata-like covers of the prior art.

The invention has been described with reference to the preferred embodiments. Obviously, modifications and alterations will occur to others upon a reading and understanding the preceding detailed description. It is intended that the invention be construed as including all such modifications and alterations in so far as they come within the scope of the appended claims or the equivalents thereof.

We claim:

1. A multi-layer golf ball comprising:
    a core;
    an outermost cover layer disposed about said core;
    at least one inner layer disposed within said multi-layer golf ball and between said core and said outermost cover layer, wherein at least one of said at least one inner layer is harder than said outermost cover layer; and
    at least 50 parts by weight of non-ionomeric polyolefin material disposed in at least one of said inner layer, said parts by weight based on 100 parts weight of said at least one inner layer within which said non-ionomeric polyolefin material is disposed.

2. The multi-layer golf ball of claim 1 wherein said core is a dual core assembly.

3. The multi-layer golf ball of claim 1 wherein said core is a triple core assembly.

4. The multi-layer golf ball of claim 1 wherein said core is a cellular core.

5. The multi-layer golf ball of claim 1 wherein said core is a liquid-filled core.

6. The multi-layer golf ball of claim 1 wherein said outermost cover layer comprises a polyurethane.

7. A multi-layer golf ball comprising:
    a core;
    an outermost cover layer disposed about said core, said outermost cover layer having a Shore D hardness less than 55;
    at least one inner layer comprising an ionomer disposed within said multi-layer golf ball and between said core and said outermost cover layer, and
    at least 75 parts by weight of non-ionomeric polyolefin material disposed in at least one of said inner layer, said parts by weight based on 100 parts weight of said at least one inner layer within which said non-ionomeric polyolefin material is disposed.

8. The multi-layer golf ball of claim 7 wherein said core is a dual core assembly.

9. The multi-layer golf ball of claim 7 wherein said core is a triple core assembly.

10. The multi-layer golf ball of claim 7 wherein said core comprises a cellular material.

11. The multi-layer golf ball of claim 7 wherein said core comprises a liquid or liquid filled component.

12. The multi-layer golf ball of claim 7 wherein said outermost cover layer comprises a polyurethane material.

13. The multi-layer golf ball of claim 7 wherein at least one of said at least one inner layer is harder than said outermost cover layer.

14. A multi-layer golf ball comprising:
    a core;
    an outer cover layer disposed about said core, said outer cover comprising a polyurethane material;
    an inner cover layer disposed within said mold-layer golf ball and between said core and said outer cover layer; and
    at least 50 parts by weight of non-ionomeric polyolefin material disposed in said inner cover layer, said parts by weight based on 100 parts weight of said inner cover layer within which said non-ionomeric polyolefin material is disposed.

15. The multi-layer golf ball of claim 14 wherein said core is a dual core assembly.

16. The multi-layer golf ball of claim 14 wherein said core is a triple core assembly.

17. The multi-layer golf ball of claim 14 wherein said core comprises a cellular material.

18. The multi-layer golf ball of claim 14 wherein said core comprises a liquid or liquid filled component.

19. The multi-layer golf ball of claim 14 further comprising a metal mantle disposed about said core.

20. The multi-layer golf ball of claim 14 wherein said inner cover layer comprises an ionomer.

* * * * *